United States Patent
Candelaria

(10) Patent No.: US 9,448,877 B2
(45) Date of Patent: Sep. 20, 2016

(54) METHODS AND APPARATUS FOR ERROR DETECTION AND CORRECTION IN DATA STORAGE SYSTEMS USING HASH VALUE COMPARISONS

(71) Applicant: CISCO TECHNOLOGY, INC., San Jose, CA (US)

(72) Inventor: James Candelaria, Branchburg, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 344 days.

(21) Appl. No.: 13/844,272

(22) Filed: Mar. 15, 2013

(65) Prior Publication Data

US 2014/0317479 A1  Oct. 23, 2014

(51) Int. Cl.
G06F 11/10 (2006.01)
G06F 11/00 (2006.01)
G06F 11/07 (2006.01)

(52) U.S. Cl.
CPC ....... *G06F 11/1004* (2013.01); *G06F 11/0727* (2013.01); *G06F 11/0763* (2013.01); *G06F 11/108* (2013.01); *G06F 2211/1057* (2013.01); *G06F 2211/1061* (2013.01)

(58) Field of Classification Search
None
See application file for complete search history.

(56) References Cited

U.S. PATENT DOCUMENTS

| | | | |
|---|---|---|---|
| 5,588,012 A | 12/1996 | Oizumi | |
| 7,707,481 B2 * | 4/2010 | Kirschner et al. | 714/763 |
| 7,979,670 B2 * | 7/2011 | Saliba | G06F 3/0608 |
| | | | 711/202 |
| 8,196,018 B2 * | 6/2012 | Forhan et al. | 714/770 |
| 9,141,554 B1 | 9/2015 | Candelaria | |
| 9,280,487 B2 | 3/2016 | Candelaria | |
| 2002/0073276 A1 * | 6/2002 | Howard | G06F 11/1471 |
| | | | 711/113 |
| 2004/0128470 A1 | 7/2004 | Hetzler et al. | |
| 2006/0215297 A1 | 9/2006 | Kikuchi | |
| 2009/0193223 A1 | 7/2009 | Saliba et al. | |
| 2011/0252274 A1 * | 10/2011 | Kawaguchi et al. | 714/6.2 |

(Continued)

FOREIGN PATENT DOCUMENTS

CN  105122213 A  12/2015
WO  WO2014/151758  9/2014

OTHER PUBLICATIONS

PCT Jul. 29, 2014 International Search Report and Written Opinion of the International Searching Authority from International Application PCT/US2014/026400.

(Continued)

*Primary Examiner* — Justin R Knapp
(74) *Attorney, Agent, or Firm* — Patent Capital Group

(57) ABSTRACT

Data processing methods and apparatus for processing stored data with error correcting bits to detect and in some instances correct errors. The data processing including, e.g., techniques such as the detection of errors by comparing hash values of data retrieved from storage with hash values of the data generated during storage. For example, one embodiment of a method in accordance with the present invention includes reading data stored with error correcting bits from a storage device, performing a hash operation on the data read from the storage device to generate a first hash value, comparing said first hash value to a previously generated hash value corresponding to said data, and determining that a read error has occurred when said first hash value does not match said previously generated hash value. In some embodiments, the method further includes performing an error recovery operation upon detection of an error.

15 Claims, 14 Drawing Sheets

(56) References Cited

U.S. PATENT DOCUMENTS

| | | | |
|---|---|---|---|
| 2013/0318288 A1* | 11/2013 | Khan et al. ............. | 711/103 |
| 2014/0164866 A1* | 6/2014 | Bolotov et al. ............. | 714/758 |
| 2014/0229790 A1* | 8/2014 | Goss ............. | H03M 13/2906 714/755 |
| 2014/0244897 A1* | 8/2014 | Goss ............. | G06F 12/0246 711/103 |
| 2014/0325208 A1* | 10/2014 | Resch et al. ............. | 713/156 |

OTHER PUBLICATIONS

"Delphi—Save a CRC value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-wihout-altering-the-actual-crc-checksum.

Nelson, Mark, "File Verification Using CRC," Dr. Dobb's Journal, May 1, 1992, pp. 1-18, XP055130883 http://marknelson.us/1992/05/01/file-verification-using-crc-2/.

PCT Sep. 15, 2015 International Preliminary Report on Patentability and Written Opinion of the International Searching Authority from International Application PCT/US2014/026400.

* cited by examiner

METHODS AND APPARATUS FOR ERROR DETECTION AND CORRECTION IN DATA STORAGE SYSTEMS USING HASH VALUE COMPARISONS

FIELD

The present application relates to data processing methods and apparatus and, more particularly, to methods and apparatus for error detection and correction in data storage systems.

BACKGROUND

With the rise of computer systems and the ever increasing reliance of industries, businesses, and individuals on the use of electronic data there has arisen a need to be able to successfully store and retrieve large amounts of data in electronic form in a fast, efficient and economical way. For purposes of storing electronic data, hereinafter simply referred to as data, data is often broken up into blocks of a particular size. For example, data may be broken into 4 kilobyte blocks referred to as 4k blocks of data.

One important aspect of data storage and retrieval is that the integrity of the data should be maintained with the data retrieved by a read operation being the same as the data that was stored by a previous write operation. Another important aspect is the speed at which the data may be stored and retrieved. In some known systems, the data to be stored is distributed across a number of data storage elements, e.g., hard disk and/or solid state drives.

In some known systems, because of the time it takes to check for errors when previously stored data is read from a storage device such known systems typically use light weight error correction techniques such as for example single bit error detection techniques. Single bit error detection techniques such as a simple parity check is easy to implement, e.g., the bits are XORed and the result is compared to a parity check bit that is stored with the data. The parity check may be performed on relatively small data units, e.g., a set of a few or hundreds of bits. While a parity check is easy to implement, it has the disadvantage that if an even number of bits have errors, e.g., there is a two bit error, the error may go undetected by the parity check. Thus a multi-bit error can result in an undetected read data error when two or more bit errors mask the error leaving it undetected by the parity check operation.

Absent the parity check failing, most drive systems normally return the data read from the disk without performing additional checks on the data even though the system may store additional error correction and/or detection information such as a set of parity bits, e.g., on a different data storage device than the data storage device from which the data was read, for use in the case of detection of a read error. Moreover, the light weight error checks which are implemented in a drive such as CRC parity checks and BCH checks do not detect errors introduced by a noisy channel for example a channel experiencing electromagnetic interference (EMI). This is so because the drive error checks are made at the drive not have the data has been read.

It should be appreciated that there is a need for data processing methods and apparatus that can increase data storage integrity by increasing the number of read errors detected and which can provide higher levels of bit error detection on read operations than is provided by the current light weight error detection techniques such as a simple single bit parity check. While improved error detection techniques are desirable, it is desirable that new or improved error detection techniques used for read operations do not introduce excessive amounts of additional processing and/or delays with regard to each read operation.

SUMMARY

Data processing methods and apparatus for efficiently storing and retrieving data, e.g., blocks of data, to and from memory are described with retrieved data being checked for errors in a more robust manner than is possible using prior known light weight techniques such as a single bit parity check, light weight cyclic redundancy checking or light weight bch error detection codes.

In various embodiments the methods and apparatus leverage use of a hash value that is generated for example from a mumur hash function and stored during the process of writing a block of data to a storage device. The hash value provides a more robust error detection capability that is a heavier weight technique than the single bit parity check, cyclic redundancy check, or bch error detection codes typically used. This is at least partially because, at least in some embodiments, a relatively large hash value is used, e.g., 24-31 bits, which is considerably longer and thus more reliable than many CRC or BCH codes commonly used. The hash value corresponding to a block of data, which is stored as part of the write process, is used in some embodiments to perform a quick and relatively easy to implement error check on a recovered block of data read from a storage device. In some embodiments, the generation and storage of the hash value is part of a data de-duplication of a write operation.

During the write process, the block of data being stored is subject to a hash operation and a hash value is generated for the data block being stored. The hash value may, and in some embodiments is, used as part of a data de-duplication process. The hash value for a data block is stored and is available at the time a read operation is performed.

In at least some embodiments, portions of a data block, e.g., data portions, are stored on different drives of a storage array. Individual parity bits may and normally are stored on each drive for the data portion stored on the individual drive. The parity bits stored on a drive including a portion of the data block are used to perform simple parity checks on the data as it is read from the disk. Assuming the simple parity checks do not result in an error the data read from the drive is returned. The data portions read from the multiple drives is provided by a drive controller, e.g., a RAID controller, in response to a request to read a stored block of data and returned, assuming no parity check errors, in response to the request to read the block of data.

In accordance with one feature, a hash value is generated from the returned block of data using the same hash function which generated the original hash value for the data block during the write operation. The generated hash value is compared to the stored hash value that was generated previously, e.g., as part of a data de-duplication process performed during a write operation.

The hash value generated from the recovered block of data read from the storage drives is then compared to the previously stored hash value. If there is a miss-match, an error condition is indicated and a fault, e.g., error notification and/or correction operation is performed. Notably, since the hash value was generated over the whole block using a hash function which differs from the simple XOR operation that may be used to implement a simple parity check, it is able to detect errors which may have gone undetected by the simple parity check performed by the individual drives during the read operation.

Given that generation of the hash value for the data block retuned in response to the read operation can be implemented relatively quickly, and sometimes using hardware and/or software already included to support generation of hash values as part of a data de-duplication operation performed for write operations, and given that comparing the generated hash value to the previously generated and stored hash value is not computationally intensive or complex, the error detection technique described herein can be implemented at little or no additional cost and without introducing significant delays into the read process associated with recovering a previously stored block of data.

In various embodiments when an error is detected by the comparison of the hash value generated from the hash of the data block returned from the read operation and the hash value for the data block generated as part of the write operation indicates a miss-match and thus an error in the returned data block, a fault notification process is initiated and, in some embodiments, steps are taken to identify the drive in the storage array which was responsible for the return of faulty data.

The fault notification process may, and in some embodiments does involve notifying a drive controller of the error in the returned data block. The drive controller, e.g., a RAID controller, may then take steps to check the drives which were used to store portions of the data block which included the error. This may involve using parity bits on one or more of the drives managed by the controller to identify errors in the portions of data stored on the various drives used to store portions of the data block.

In some embodiments, where parity information for the portions of the data block stored on individual drives is generated and stored as a set of parity bits, e.g., such as occurs in the case of a RAID 3, 4, 5, or 6, the system detecting the error can and sometimes does help the drive controller, e.g., RAID controller identify the faulty drive.

In one such embodiment where N−1 drives store portions of a data block which was read back with an error and an Nth drive stores a set of parity bits for the data stored on the N−1 drives, e.g., parity bits which are generated across the stripe of data stored on the multiple drives, the system which detected the read error requests that the RAID controller perform multiple different reads of the data block stored across the drives but reading the data from different sets of N−1 drives, e.g., by indicating that a particular one of the N drives used to store portions of the data block and/or party bits across the portions of the data block be excluded from the read operation. Thus during each read of the data block the returned data block after an error is detected will be generated from a different combination of N−1 drives.

A hash is generated from each returned block provided in response to a request to read the block from N−1 drives. The generated hash value for the returned block is compared to the stored hash value which was generated as part of the write operation. When the hash value generated from the returned block of data matches the stored hash value, the drive which was excluded from the read operation is determined to have included the fault which resulted in the detected error. In this manner a faulty drive can be identified.

After identification of the faulty drive the drive controller and/or drive which was determined to be faulty is notified of the detected fault and the drive controller and/or drive implements steps to rebuild the faulty data block, identify faulty storage locations, e.g., drive sectors, which resulted in the fault, and/or to lock out all or some of the drive storage elements used to store the portion of the data block which included the detected error.

By leveraging the hash computation capabilities, and storage of a hash value performed as part of a data write operation, error detection corresponding to read operations is enhanced with little or no additional hardware costs and minimal delays, if any, being introduced into read operations. The hash functions used in some embodiments, unlike parity checks and CRC checks, are one way are not reversible. The use of relatively long hash values generated by one way non-reversible hash functions in some embodiments provides much heavier weight error detection capabilities that provide an improved and more robust error detection and recovery mechanism when compared to the relatively light weight prior art parity bit checks used in some systems.

The methods and apparatus of the present invention are implemented in some embodiments on a storage node which includes a processor which performs hash functions using software without the aid of specialized hash function hardware. The storage node may include silicon storage for storing the data blocks as well as the tables and/or linked lists used for accessing the stored blocks of data.

While various exemplary embodiments and features have been described, numerous additional features and embodiments are described in the detailed description which follows.

DETAILED DESCRIPTION

Figure 1:
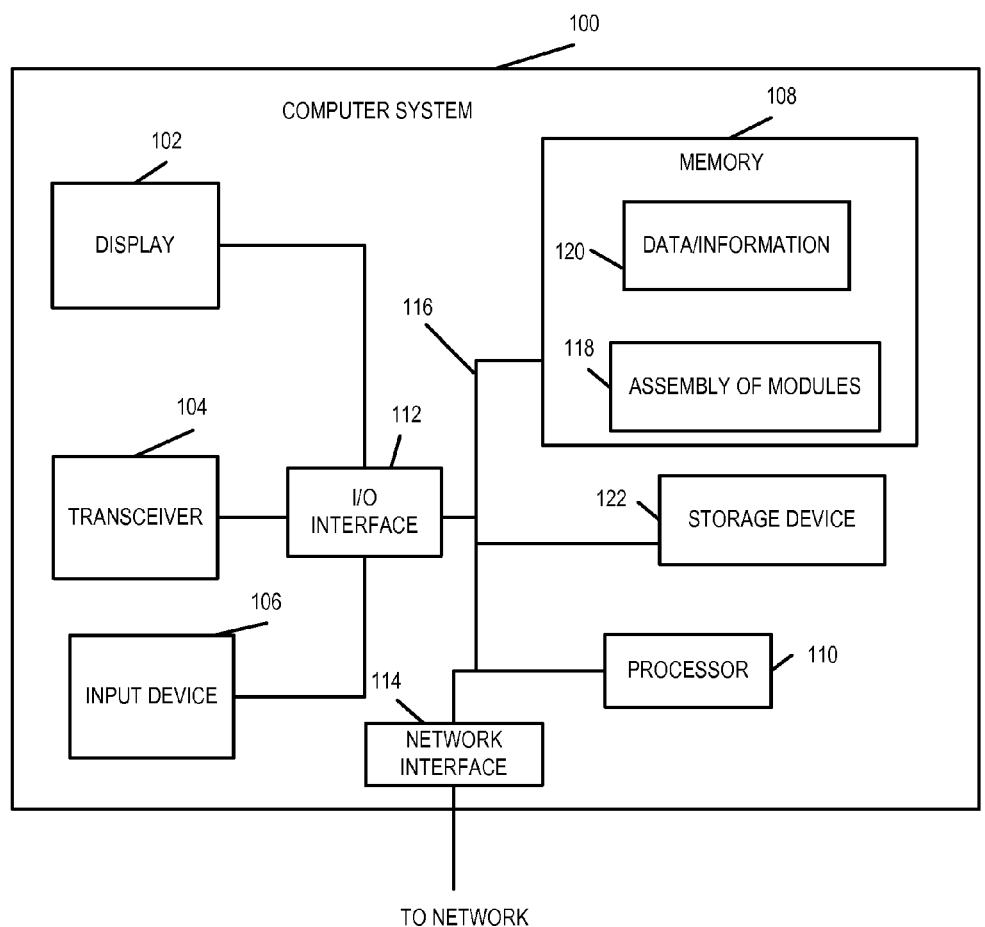
FIG. 1 illustrates an exemplary system in accordance with one embodiment of the present invention.

FIG. 1 illustrates an exemplary system, e.g., computer system 100, for processing data, e.g., writing and reading data from memory such as a storage device, e.g., RAID 5 storage device, in accordance with one embodiment of the present invention. The data being processed may be, and in various embodiments are, blocks of data. In some embodiments of the present invention, the exemplary system 100 is implemented as an apparatus.

The exemplary system 100 includes a display device 102, a transceiver 104 for transmitting and receiving items such as for example requests, commands, instructions, data and information, an input device 106, e.g., keyboard that may be used for inputting information, data and/or instructions, memory 108, a storage device 122, a processor 110, a network interface 114, and an I/O interface 112. The display device 102 may be, and in some embodiments is, used to display information regarding the configuration of the system and/or status of data processing being performed by the system. The display device 102, transceiver 104 and input device 106 are coupled to a bus 116 by an I/O interface 112. The bus 116 is also coupled to the memory 108, storage device 122, processor 110 and network interface 114. The network interface 114 couples the internal components of the system 100 to an external network, e.g., the Internet, thereby allowing the system 100 to receive data for processing over a network or output processed data to the network.

The processor 110 controls operation of the system 100 under direction of software modules and/or routines stored in the memory 108. Memory 108 includes memory assembly of modules 118 wherein one or more modules include one or more software routines, e.g., machine executable instructions, for implementing the data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., received logical block address of the data block to read from the storage device, data block read from the storage device, computed hash value of read data block, and logical block address to hash table) are stored in data/information memory 120 for future use or additional processing and/or output, e.g., to display device 102 to be displayed. Storage device 122 is a device including memory used for storing data such as data blocks received for storage and later retrieval. The storage device 122 can be a parity RAID (Redundant Array of Independent Drives) storage system, e.g., RAID 3, 4, or 5 system containing 3 or more memory storage elements or RAID 6 system containing 4 or more memory storage elements. Exemplary memory storage elements include optical disk drives, magnetic disk drives, solid state silicon memory drives such as NAND FLASH memory drives, etc. The memory 108 includes different types of memory for example, Random Access Memory (RAM) in which the assembly of modules 118 and data/information 120 may be, and in some embodiments are, stored during data processing activities, and Read Only Memory (ROM) or other non-volatile memory in which the assembly of modules 118 memory be stored for example to be available after a power down or power interruption.

In some but not all embodiments the network interface 114 supports a 4/8 GB/s Fibre Channel connection, 1/10 Gb Ethernet connection, and/or a 40 Gb Infiniband channel.

Figure 2:
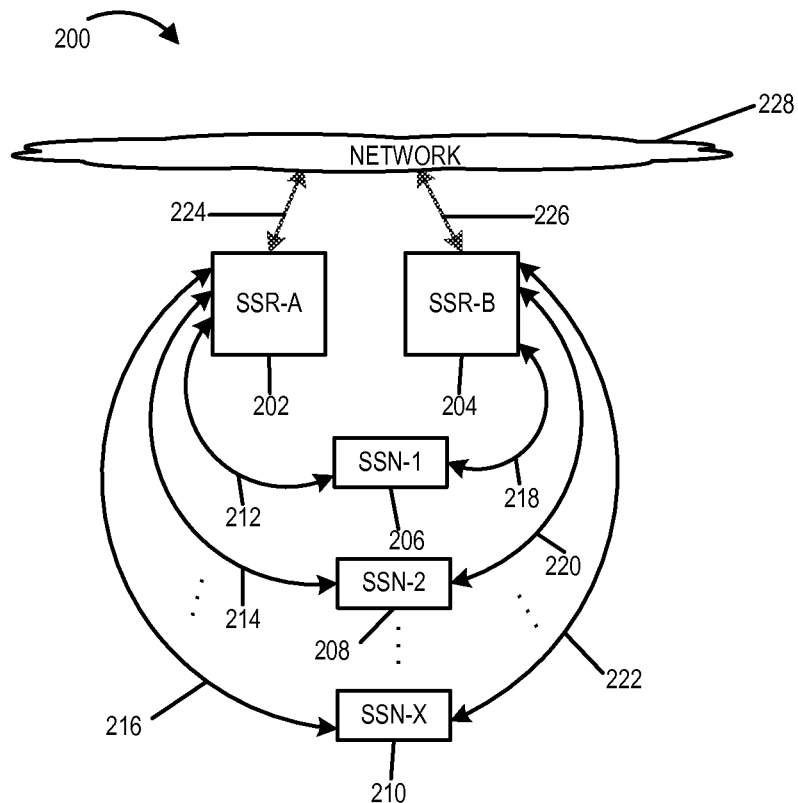
FIG. 2 illustrates exemplary silicon storage nodes in accordance with one embodiment of the present invention used in an exemplary solid state storage array coupled to a network.

In some embodiments of the present invention exemplary system 100 is a silicon storage node (SSN) such as SSN-1 202 of FIG. 2 that may be, and in some embodiments of the present invention, is part of a solid state storage array.

FIG. 2 illustrates an exemplary solid state storage array 200 including exemplary silicon storage routers SSR-A 202 and SSR-B 204 and silicon storage nodes SSN-1 206, SSN-2 208, . . . , SSN-X 210. Data links 212, 214, . . . , 216, 218, 220, . . . , 222 couple various elements of the solid state storage array and allow for the communication of requests, commands, instructions, data and information to occur between the various components included in the solid storage array 200. Data link 224 couples the SSR-A 202 to a network 228 which may, and in some embodiments does, include additional storage equipment. Data link 226 similar to data link 224 couples SSR-B 204 to network 228. SSR-A and SSR-B are only meant to be exemplary as in some systems there are additional silicon storage routers and additional data links for connecting the routers to silicon storage nodes and the network 228. Data links 224 and 226 allow for the communication of requests, commands, instructions, data and information to occur between the silicon storage routers of the solid state array and the equipment included in the network 228. Data links 212, 214 and 216 couple silicon storage router SSR-A 202 to silicon storage nodes SSN-1 206, SSN-2 208, and SSN-X 210 respectively. Data links 218, 220 and 222 couple silicon storage router SSR-B 204 to silicon storage nodes SSN-1 206, SSN-2 208, and SSN-X 210 respectively. The illustrated number of silicon storage routers, silicon storage nodes, and the number and arrangement of data links used to couple them together is only meant to be exemplary and may vary.

Figure 3:
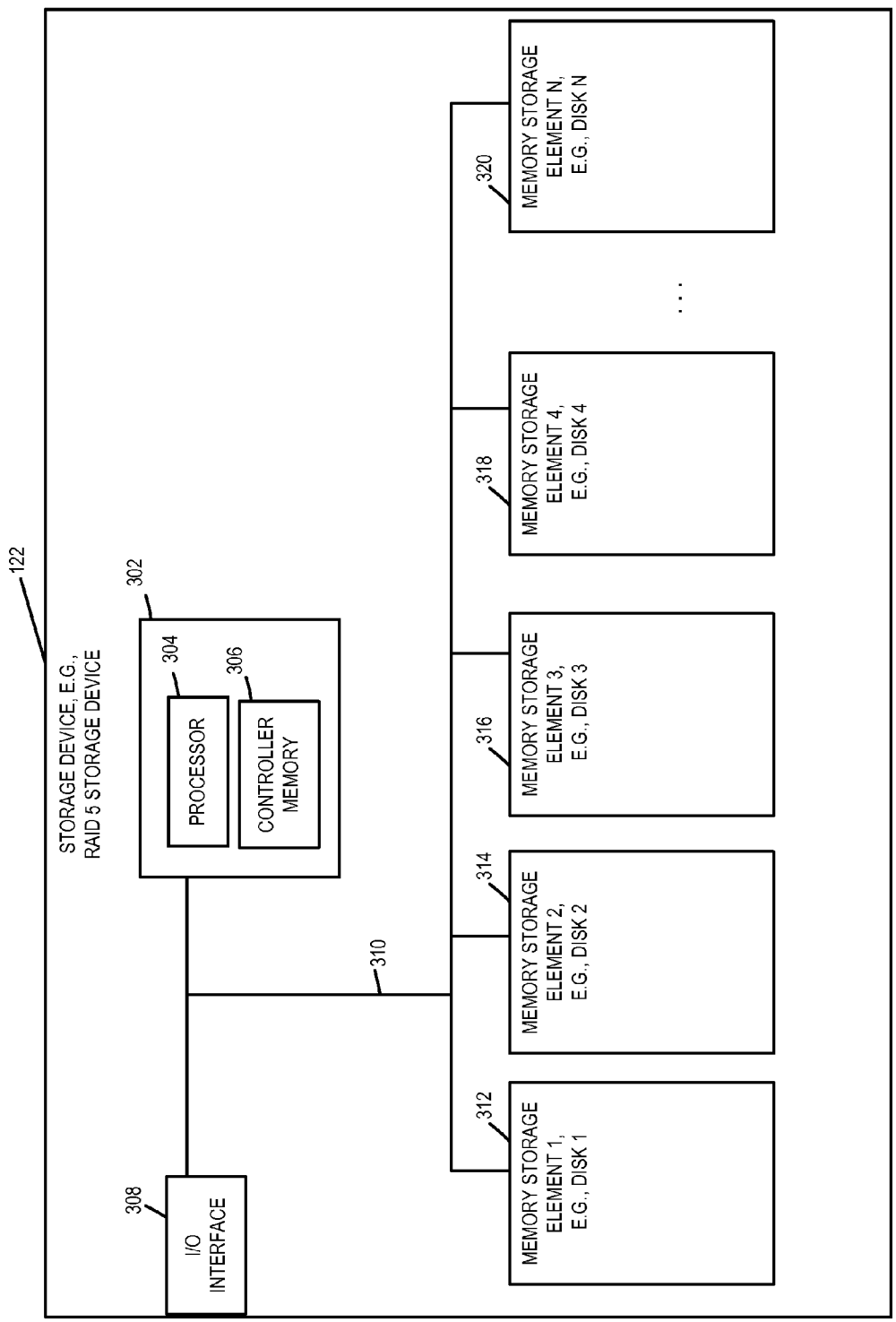
FIG. 3 illustrates an exemplary storage device in accordance with one embodiment of the present invention.

FIG. 3 provides additional details of exemplary storage device 122 from FIG. 1. The exemplary storage device 122 is for example a RAID 5 storage device including an input/output (I/O) interface 308, a storage device controller 302, e.g., a RAID control module, memory storage 1 312 for example disk 1, memory storage 2 314 for example disk 2, memory storage 3 316 for example disk 3, memory storage 4 318 for example disk 4, . . . , memory storage N 320 for example disk N. The storage device control module 302 which will also be referred to as RAID control module 302 in the exemplary embodiment includes a processor 304 and memory 306. The memory 306 includes instructions which are executed on the processor 304 to operate the storage device 122 and store, retrieve and maintain the data on the RAID memory storage elements 312, 314, 316, 318, . . . , 320. Communication link 310 which may be a bus that couples the I/O Interface 308 to the RAID control module 302 to the memory storage elements 312, 314, 316, 318, . . . , 320. The storage device 122 is capable of parallel processing, reading, writing and transferring of data such as data written to or read from the memory storage elements 1, 2, 3, 4, . . . , N.

In at least some embodiments, the RAID control module 302 does not contain a processor but is instead a software module including software instructions stored in controller memory 306. In at least some of such embodiments the storage devices includes a processor that is connected to the bus 310 on which the software instructions of the control module are executed. In some embodiments where the RAID control module 302 is a software module, the instructions of the module are executed on processor 110 of system 100.

The memory storage elements 1, 2, 3, 4, . . . , N are in many but not all implementations non-volatile memory storage elements. The type of memory used for each memory storage element 1, 2, 3, 4, . . . , N may vary but in most embodiments is chosen to be the same so that the speed with which data blocks can be stored and retrieved from the memory storage elements is substantially the same. In some embodiments, solid state or silicon disk arrays for example NAND flash memory silicon storage elements are used in accordance with one embodiment of the present invention. In some embodiments optical disks are used. In some embodiments magnetic disks are used. In some embodiments drums are used instead of disks.

Figure 4:
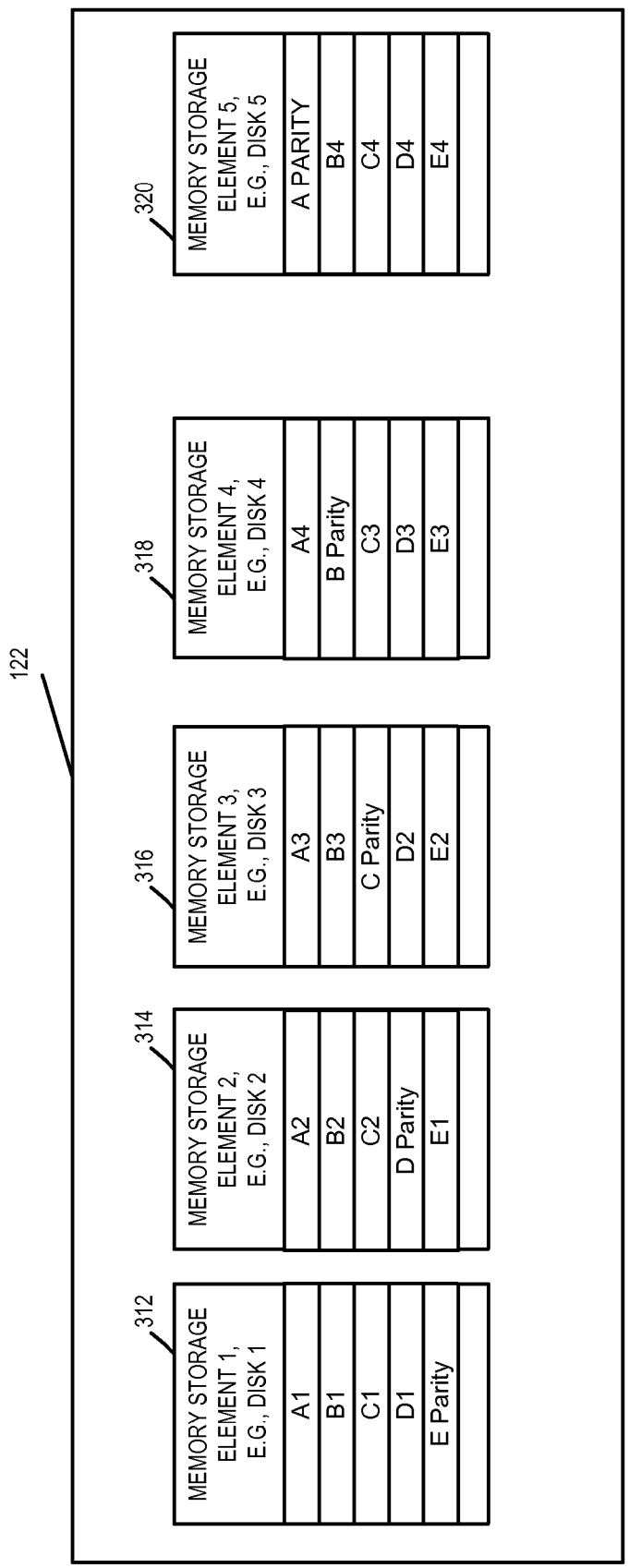
FIG. 4 illustrates exemplary storage elements of an exemplary storage device in accordance with one embodiment of the present invention.

FIG. 4 illustrates exemplary storage elements of an exemplary storage device in accordance with one embodiment of the present invention. FIG. 4 illustrates an exemplary way that five data blocks A, B, C, D and E may be segmented and stored in the memory storage elements of the storage device 122 when N=5 that is when there are five memory storage elements used for storing the exemplary blocks of data and corresponding error correcting code bits, e.g., parity bits. In the exemplary embodiment shown in FIG. 4 a RAID 5 storage configuration is implemented wherein the block of data A is divided into four equal parts A1, A2, A3, and A4 with the data bits corresponding to part A1 stored in memory storage element 1 312, the data bits corresponding part A2 stored in memory storage element 2 314, the data bits corresponding to part A3 stored in memory storage element 3 316, the data bits corresponding to part A4 stored in memory storage element 4 318, and the error correcting bits, e.g., parity bits generated from bits corresponding to parts A1, A2, A3, and A4 are stored in memory storage element 5. The portions of the memory storage elements in which data block A and its corresponding parity bits are referred to as a stripe. The data blocks B, C, D and E and their corresponding parts and error correcting bits are similarly stored in memory storage elements 1, 2, 3, 4, and 5 in a distributed manner as shown in FIG. 4. By distributing the data and parity bits associated with data A across multiple memory storage elements, the system can recover the stored data A even in the event that one of the memory storage elements fails or becomes corrupted. However, for the data A to be recovered in the event of bits becoming corrupted the system needs to identify which memory storage element contains the corrupted bits. Some storage systems generate a checksum for each portion of the data stored on a memory storage element, e.g., a checksum can be generated for parts A1, A2, A3, and A4. Each checksum is then stored in a data integrity portion or segment of the memory storage element on which the corresponding data bits from which the checksum was generated is stored. For example, the checksum corresponding to the data bits forming part A1 is stored on memory storage element 1. The checksum corresponding to the data bits forming part A2 is stored on memory storage element 2. The checksum corresponding to the data bits forming part A3 is stored on memory storage element 3. And, the checksum corresponding to the data bits forming part A4 is stored on memory storage element 4. When a read data A operation occurs and the part A1 data bits are read out of the storage element 1, a checksum is generated and compared to the part A1 checksum value stored in data integrity portion of memory storage element 1. Similarly, the part A2 data bits are read out of the storage element 2, a checksum is generated and compared to the part A2 checksum value stored in data integrity portion of memory storage element 2; the part A3 data bits are read out of the storage element 3, a checksum is generated and compared to the part A3 checksum value stored in data integrity portion of memory storage element 3; and the part A4 data bits are read out of the storage element 4, a checksum is generated and compared to the part A3 checksum value stored in data integrity portion of memory storage element 4. While these checksum checks can identify some errors they are a light weight error detection technique and cannot identify many errors such as errors where two bits in parts A1, A2, A3 or A4 are flipped. For example, in such a case the checksum generated for data retrieved from the memory storage element 1 will match the stored part A1 checksum even though it contains errors. The checksum comparison is done by the memory storage element and is not performed at the RAID level. At the RAID level while an error might be detected if a parity check across the stripe was performed the RAID control module, e.g., RAID controller implementing RAID 5 cannot determine which data storage element contains the faulty data or even whether the data is uncorrupted but the corresponding parity bits are corrupted. In the present invention by performing the additional hash value check on the read data the memory storage element with the corrupted data bits can be identified.

Figure 5:
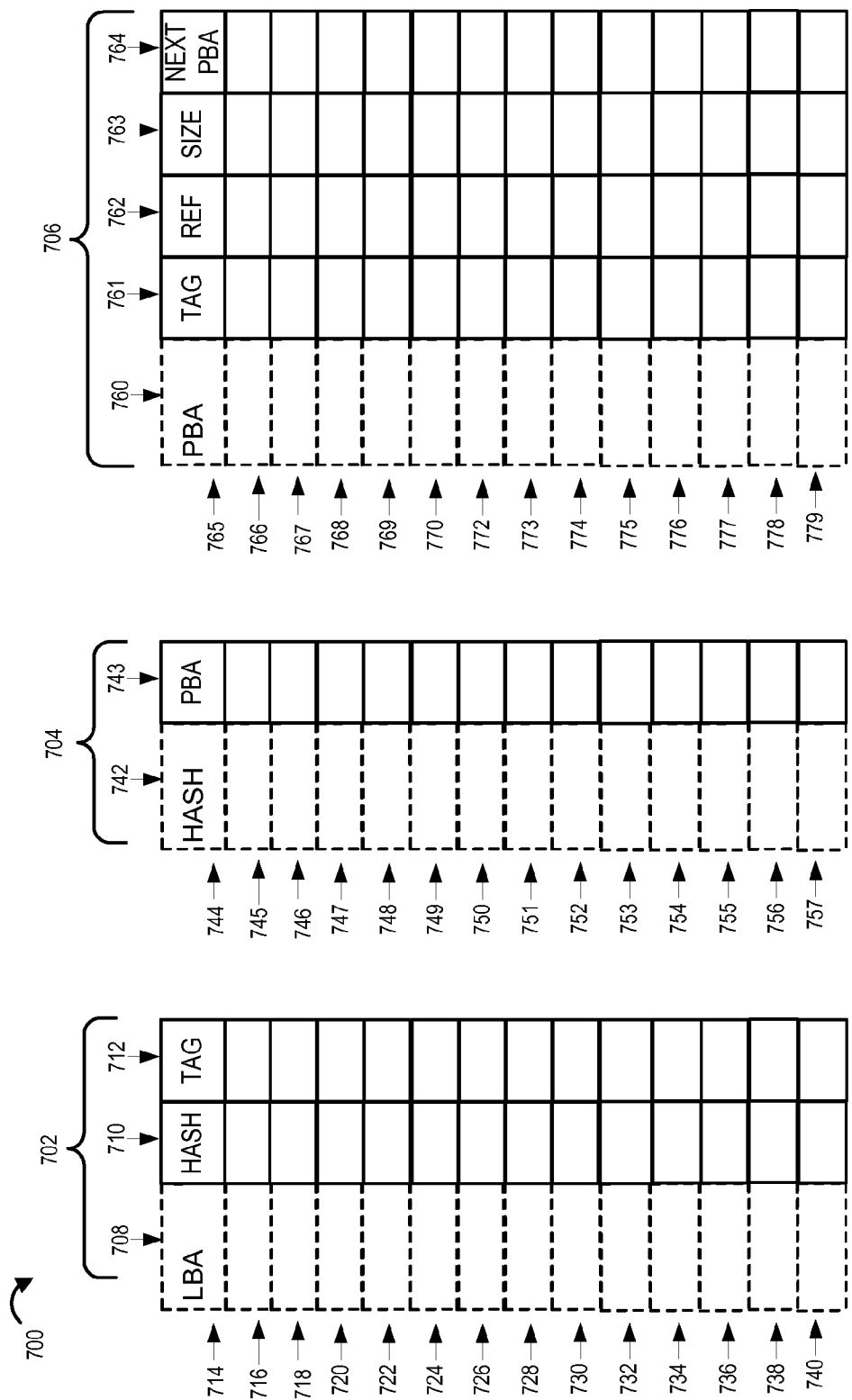
FIG. 5 illustrates exemplary tables that may be, and in some embodiments are, used in implementing the present invention.

FIG. 5 illustrates exemplary tables that may be, and in some embodiments are, used in implementing the present invention. Diagram 700 includes logical block address (LBA) to hash value (hash) table 702 also referred to herein as LBA to hash table 702, hash value to physical block address (PBA) table 704 also referred to herein as hash to PBA table, and physical block address (PBA) table 706 also referred to herein as PBA table.

The LBA to hash table 702 includes three columns of information. The first row 714 of the LBA to hash table 702 is a header that is not part of the table but is merely provided to help explain the table. The first column 708 of the LBA to hash value table 702 includes logical block addresses, the second column 710 of the LBA to hash value table 702 includes hash values, and the third column 712 of the LBA to hash value table includes tag values. The table includes a plurality of rows wherein each row of the table associates the data contained in that row. For example, in the first row of the table which may contain content row 716 the logical block address in the first column 708 of the row 716 is associated with the hash value in the second column 710 of the row 716 and tag value in the third column 712 of the row 716. In some embodiments, column 708 which includes the logical block address information is merely an index into the table and not a column of data in the table.

The hash value to PBA table 704 includes two columns of information. The first row 744 of the hash value to PBA table 704 is a header that is not part of the table but is merely provided to help explain the table. The first column 742 of the hash value to PBA table 704 includes hash values and the second column 743 of the hash value to PBA table 704 includes physical block addresses. The table includes a plurality of rows wherein each row of the table associates the data contained in that row. For example, in the first row of the table which may contain content row 745 the hash value in the first column 742 of the row 745 is associated with the physical block address in the second column 743 of the row 745. In some embodiments, column 742 which includes hash values is merely an index into the table 704 and is not a column of data in the table.

The physical block address (PBA) table 706 includes five columns of information. The first row 765 of the PBA table 706 is a header that is not part of the table but is merely provided to help explain the table. The first column 760 of the PBA table 706 includes physical block addresses, the second column 761 of the PBA table 706 includes tag values, the third column 762 of the PBA table includes reference values, the fourth column 763 of the PBA table 706 includes size values, and the fifth column 764 of the PBA table includes a next physical block address. The table includes a plurality of rows wherein each row of the table associates the data contained in that row. For example, in the first row of the table which may contain content row 766 the physical block address in the first column 760 of the row 766 is associated with the tag value in the second column 761 of the row 766, the reference value in the third column 762 of the row 766, the size value of the fourth column 763 of row 766, and the next physical block address of the fifth column 764 of the row 766. In some embodiments, column 760 which includes the physical block address information is merely an index into the table and not a column of data in the table.

Figures 6, 6A, 6B, 6C:
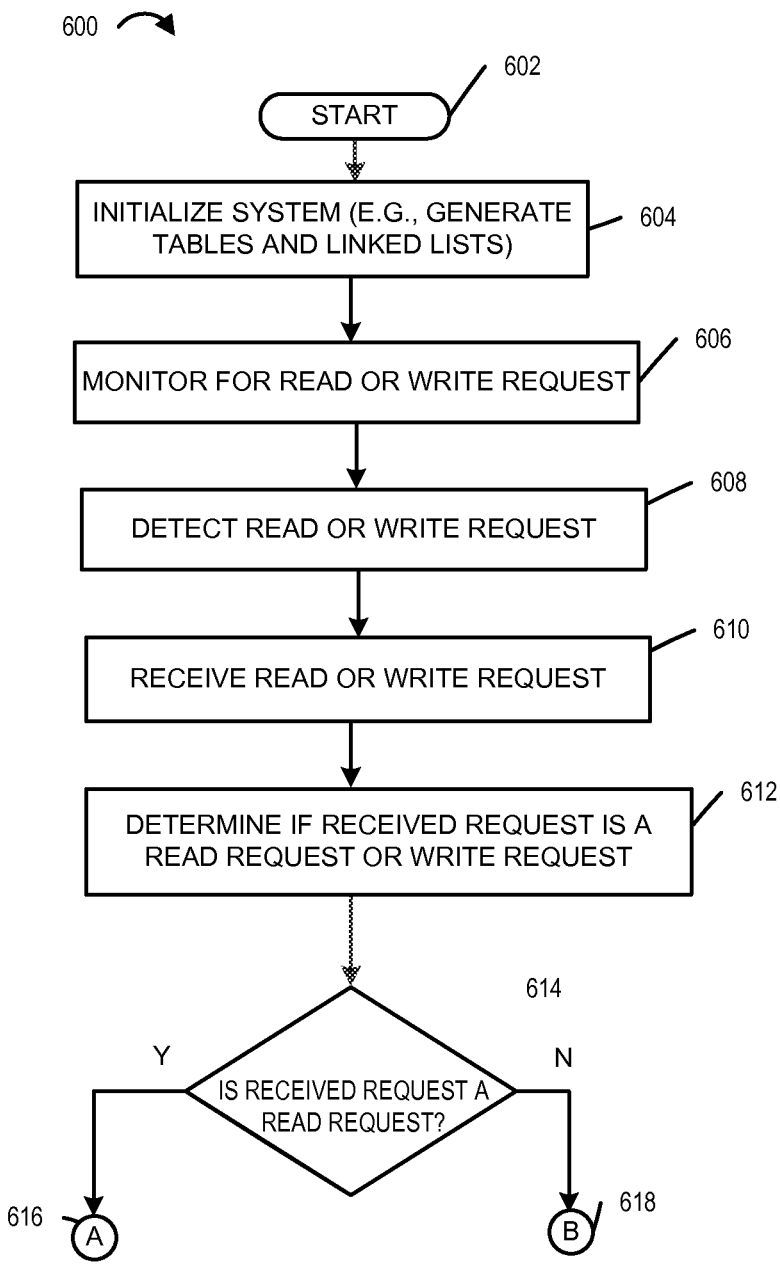
FIG. 6A which is a first part of FIG. 6 illustrates a first portion of an exemplary method for processing stored data in accordance with one embodiment of the present invention.
FIG. 6B which is a second part of FIG. 6 illustrates a second portion of an exemplary method for processing stored data in accordance with one embodiment of the present invention.
FIG. 6C which is a third part of FIG. 6 illustrates a third portion of an exemplary method for processing stored data in accordance with one embodiment of the present invention.
Figure 6B:
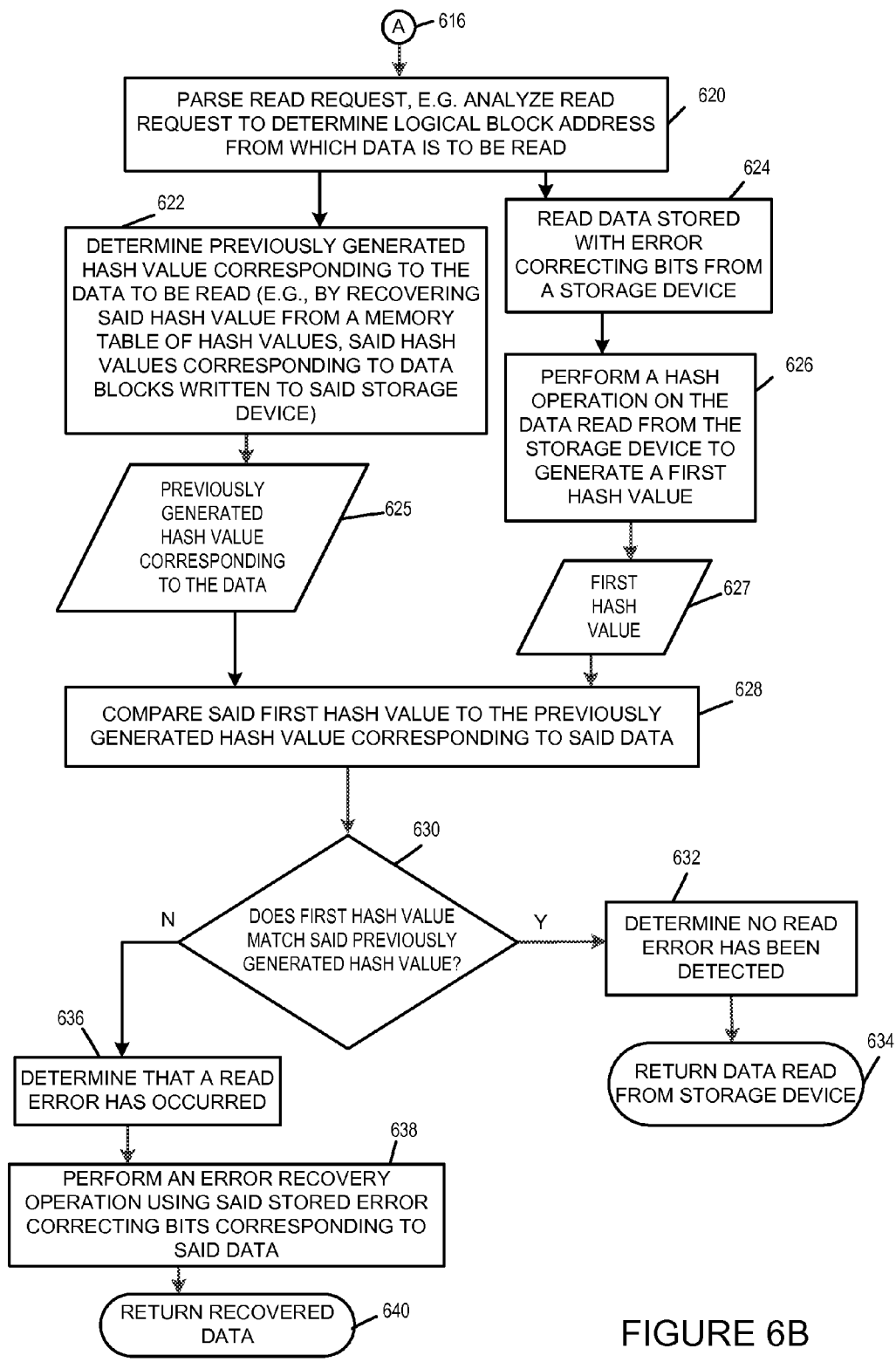
Figure 6C:
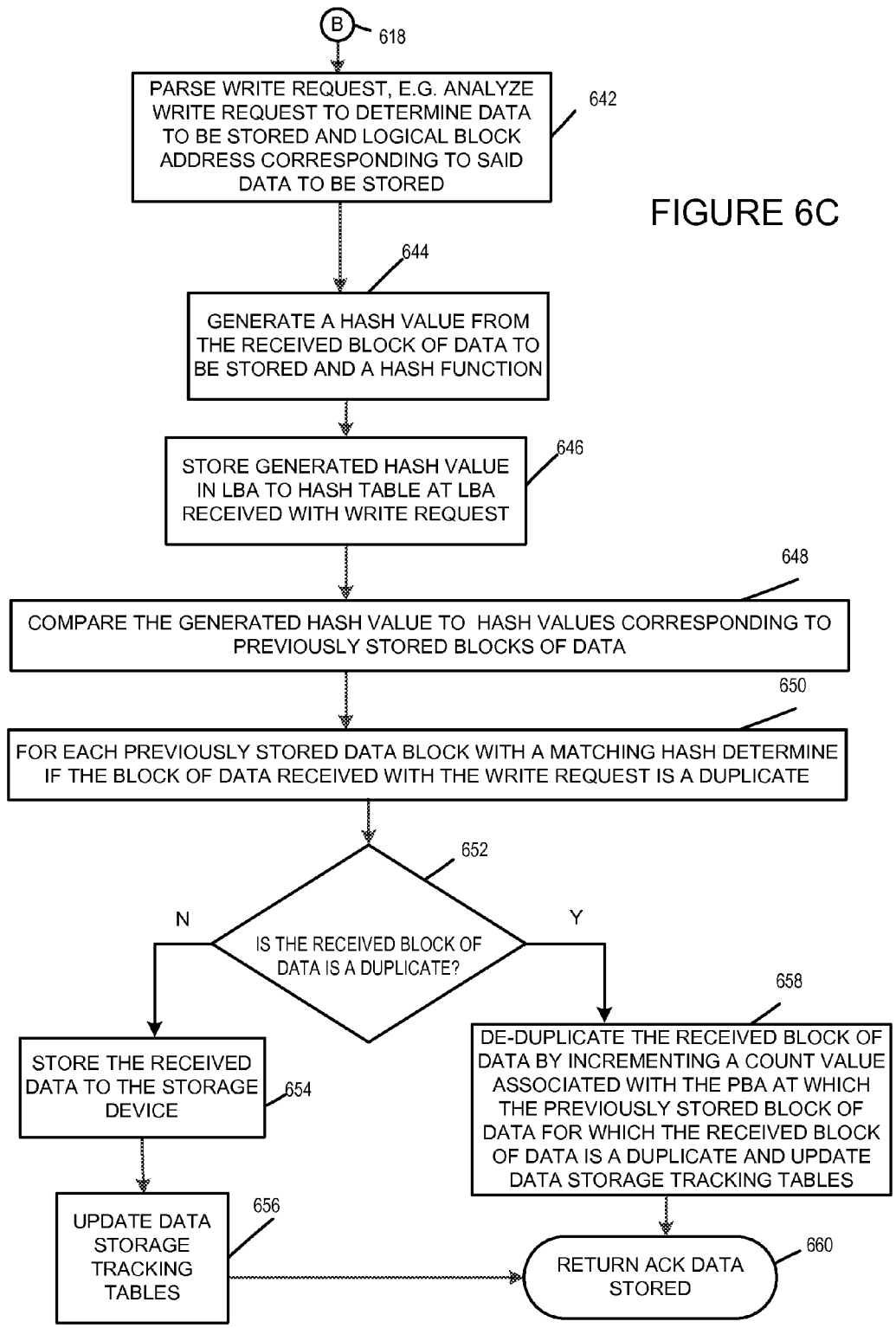

FIG. 6 which includes FIGS. 6A, 6B, and 6C illustrates an exemplary method of processing read and/or write requests or commands in accordance with an exemplary embodiment of the present invention. The method 600 of FIG. 6 is an example used to explain various features of the invention.

The processing steps of the method 600 of FIG. 6 will be now be explained in view of system 100 of FIG. 1 and exemplary storage device 122 which in this example is configured as a RAID 5 storage device wherein N is the number of memory storage elements.

The method 600 of FIG. 6 starts at start step 602 with the steps of the method being executed on processor 110 from which processing proceeds to step 604.

In step 604 the system is initialized which includes generating and initializing tables and linked lists to be used in tracking the storage locations of blocks of data to be stored in storage device 122. In some embodiments for example step 604 includes setting up a physical block address linked list (PBA linked list), a logical block address to hash value table (LBA to HASH VALUE TABLE), and a hash value to physical block address table (HASH to PBA table). In at least some embodiments of the present invention, a physical block address table (PBA table) is also created as part of the initialization process. From step 604 processing proceeds to step 606.

In step 606 network interface 114 monitors for read or write requests directed to the system 100. A request, e.g., is a read or write command and other similar instruction. In the example of method 600 of FIG. 6, a read request includes the logical block address of the data previously stored in the storage device 122. A write request in the exemplary method 600 of FIG. 6 includes the block of data to be stored in the storage device 122 and the logical block address to be associated with the block of data. Processing proceeds to step 608. In step 608, the network interface 114 detects a read or write request directed to the system 100. Processing then proceeds to step 610.

In step 610, transceiver 104 receives a read or write request via network interface 114 and I/O Interface 112. In at least some embodiments of the present invention, the I/O Interface 112 includes the transceiver 104. The read or write request may be, and in some embodiments is stored in data/information 120 section of memory 108, e.g., so that it is available for use in additional processing steps of the method 600.

Processing then proceeds to determination step 612. In determination step 612 a determination is made as to whether the received request is a write request or a read request. Processing then proceeds to decision step 614.

In decision step 614 if the received request is a read request then processing proceeds via connection node A 616 to step 620 of FIG. 6B. If the received request is not a read request that is the received request is a write request then processing proceeds via connection node B 618 to step 642 of FIG. 6C.

In step 620 the received read request is parsed. The read data request, e.g., read data block request includes the logical block address (LBA) of the data block to be read from storage device 122. The logical block address included in the read data request is identified. Processing then proceeds from step 620 in parallel to steps 622 and 624. While in the exemplary embodiments steps 622 and 624 are processed independently and in parallel, steps 622 and 624 may, and in some embodiments of the present invention are processed sequentially. In those embodiments, in which the steps 622 and 624 are processed sequentially either step 622 or step 624 may be processed first.

In step 622, the previously generated hash value corresponding to the data being requested to be read from storage device 122 is determined for example by recovering the previously generated hash value corresponding to the data being requested that is the data to be read from storage device 122 from a memory table of hash values. The hash values in the memory table of hash values correspond to data blocks written to storage device 122. For example, in some embodiments a logical block address to hash value table such as table 702 of FIG. 5 is used. The logical block address received with the read request is used as an index to the LBA to hash value table 702 to determine the previously generated hash value associated with the logical block address from which the requested data block is to be read. The previously generated hash value having been generated when the block of data was written to the storage device 122 in response to a write request. In some embodiments, the previously generated hash value is generated as part of a data de-duplication process such as that described in co-pending U.S. patent application Ser. No. 13/745,503 entitled Methods and Apparatus for Data Processing filed Jan. 18, 2013 which is hereby incorporated by reference in its entirety. The previously generated hash value corresponding to the data 625 is outputted in step 622. Processing proceeds from step 622 to step 628.

In step 624, the data stored with error correcting bits is read from a storage device. In some embodiments, such as those that use a RAID 5 compliant storage array the error correcting bits include the block parity stripe stored on one of the N storage elements on which data and parity bits are stored. In the exemplary embodiment, the logical block address received with the read request is used to determine the physical block address of the requested block of data. The processor 110 transmits a read request with the determined physical block address at which the requested data is stored in storage device 122 to the RAID control module 302 via bus 116, I/O Interface 308 and communication link 310. Processing proceeds from step 624 to step 626.

In step 626, processor 110 performs a hash operation on the data read from the storage device 122 to generate a first hash value using the same hash function used to generate the hash value when the data was written to the storage device which has been referred to as the previously generated hash value 625 in step 622. In some embodiments of the present invention, the mumur hash function, e.g., mumurhash2, is used to generate a 24 bit hash value for use in connection with the storage and retrieval of data from a storage device. The first 24 bits of the value calculated by applying the mumur hash function to the block of data is the generated hash value. The mumur hash function is exceedingly fast and has good collision resistance characteristics. The size of the hash value generated may be, and in some embodiments is, user configurable for example with the number of bits being chosen from the range of 24-31 bits. As the distribution over the hash function is approximately the same the first 24-31 bits calculated will be used as the generated hash value. The higher the number of bits used the lower the number of collisions, i.e., unique blocks of data having the same hash values. In those instance when the size of the hash value is configurable the size of the hash value is typically configured during the initialization step 604. Once set the hash value size remains in effect for all subsequent processing of data blocks as the hash value is utilized as part of the storage, retrieval, error detection, error correction and/or de-duplication processes of the present invention.

In some embodiments, the generated first hash value 627 is stored in data/information 120 portion of memory 108 so that it is available for later use such as for example in additional processing steps of method 600.

Processing proceeds to comparison step 628. In comparison step 628, the first hash value 627 generated in step 626 is compared to the previously generated hash value corresponding to said data 625 that was determined in step 622. Processing then proceeds to decision step 630.

In decision step 630, if said first hash value 627 generated in step 626 matches said previously generated hash value 625 determined in step 622 then processing proceeds to determination step 632. Otherwise, processing proceeds to step 636.

In determination step 632 it is determined that no read error has been detected. This is because the first hash value 627 which was generated from the data block retrieved from the storage device 122 matches the hash value previously generated 625 when the data block was written to the storage device. As no error has been detected, processing proceeds to return step 634. In return step 634 the data read from the storage device 122 is returned in response to the read request for example via the transceiver 104 over the I/O interface 112 and network interface 114. Processing then concludes with respect to this read request though processing in connection with other requests and the monitoring for other read and write requests continues.

In step 636, it is determined that a read error has occurred as the first hash value 627 and the previously generated hash value 625 which was generated when the block of data was stored do not match indicating that there has been an error. Processing then proceeds to step 638.

In step 638, an error recovery operation using said stored error correcting bits corresponding to said data is performed. Subroutine 800 of FIG. 8 is an exemplary subroutine that may be, and in some embodiments is, used to implement the error recovery operation of step 638. Error recovery subroutine 800 is discussed in further detail below. In some embodiments of the present invention the error recovery operation is achieved through a command sent by the processor 110 to the RAID 5 controller module 302 to indicate that the stripes on the RAID 5 memory elements 1, 2, 3, 4, . . . , N containing the retrieved data block contain errors and need to rebuilt using the error correcting bits corresponding to the data block which was read from the storage device. Upon completion of the error recovery operation, processing proceeds to return step 640.

In return step 640, the data recovered from the storage device 122 corresponding to the data requested in the read request is returned to the requestor for example via the transceiver 104 over the I/O interface 112 and network interface 114. Processing then concludes with respect to this read request though processing in connection with other requests and the monitoring for other read and write requests continues. In some embodiments, if the error recovery operation fails and the requested data is unable to be recovered a read error failure message is returned to the requestor for example via the transceiver 104 over the I/O interface 112 and network interface 114.

When the received request is a write request processing proceeds from decision step 614 via connection node B 618 to step 642 shown on FIG. 6C. In step 642 the write request is parsed, e.g., the data, e.g., logical block of data, to be stored is identified and the logical block address corresponding to said data to be stored is determined from an analysis of the write request. Processing then proceeds to hash generation step 644.

In step 644, a hash value from the received block of data to be stored and a hash function is generated. Processing then proceeds to step 646. In step 646, the hash value generated in step 644 is then stored in a hash table in memory associated with the corresponding logical block address also received with the write request. For example the generated hash value may be, and in some embodiments is, stored in LBA to hash value table 702 at the received logical block address. The LBA to hash value table 702 may be, and in some embodiments is, stored in data/information 120 of memory 108. Processing then proceeds to step 648.

In step 648, the hash value generated in step 644 is compared to hash values corresponding to previously stored blocks of data. Processing then proceeds to step 650. In step 650, for each previously stored data block with a matching hash it is determined if the block of data received with the write request is a duplicate. In some embodiments, this is achieved by retrieving the previously stored block of data from the storage device and comparing it to the received block of data to see if the two blocks are identical. Processing then proceeds to step 652.

In decision step 652, if the received block of data is a duplicate processing proceeds to step 658. Otherwise, processing proceeds to step 654.

Figure 7:
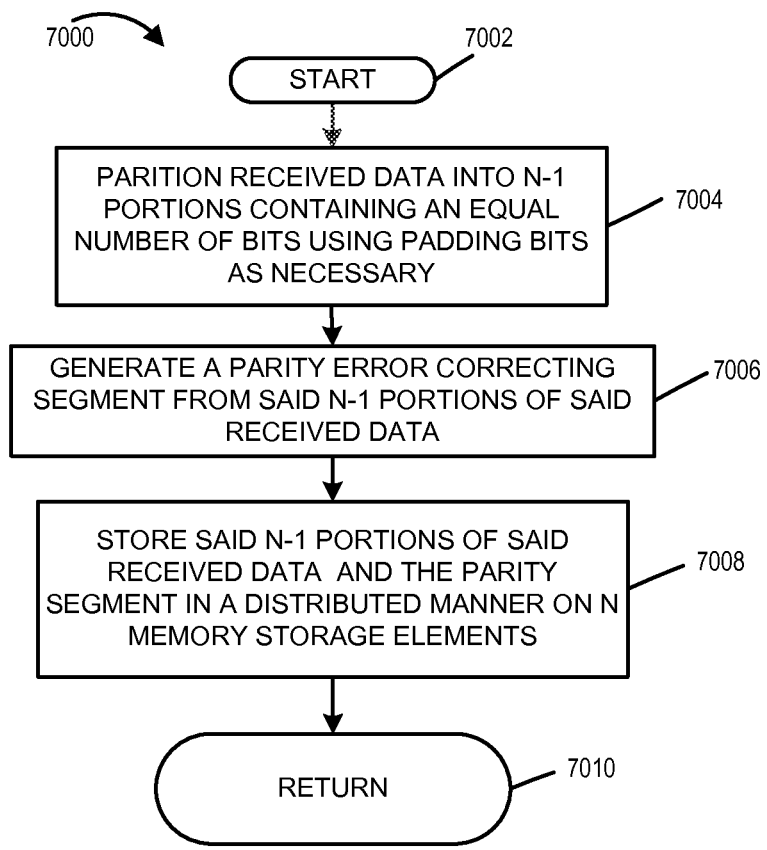
FIG. 7 illustrates an exemplary subroutine for storing data on a plurality of memory storage elements in accordance with one embodiment of the present invention.

In step 654 the received data to be stored is stored to the storage device 122. In the exemplary embodiment, the data is divided into N−1 equal portions and error correcting bits, e.g., parity bits are determined. In some embodiments where the data does not divide equally into N−1 equal portions, padding bits, e.g., zero bits, are added to the data so that the data can be divided into N−1 equal portions. The portions of data and the parity bits are then distributed over the storage elements so that each storage element of the storage device 122 includes either a portion of the data or the error correcting bits, e.g., parity bits. In some embodiments the storage device 122 is a parity RAID storage device for example a parity RAID 5 compliant storage device in which block level striping with distributed parity is implemented. In some embodiments, RAID 3 compliant storage device is used in which byte-level striping with dedicated parity is used. In some embodiments, the storage device 122 is a RAID 4 compliant storage devices with block-level striping and a dedicated parity storage element is used. In some embodiments, the storage device 122 is RAID 6 compliant storage device with block-level striping with double distributed parity. In some embodiments the error correcting bits are parity bits. In some of such embodiments, the data is divided into N-2 equal portions with parity error correcting bits being stored on the two storage elements not used for storing portions of the data of the total N storage elements. In some embodiments, e.g., RAID-6 embodiment Read Solomon error correcting coding may also be implemented during storage. Subroutine 700 of FIG. 7 illustrates an exemplary subroutine that may be, and in some embodiments is, used to implement the storage step 654. Subroutine 700 is explained in further detail below. Processing then proceeds to step 656.

In step 656, the data storage tracking tables, e.g., tables 702, 704 and 706 of FIG. 5 are updated to properly track the received data that has been stored and the physical block address at which it has been stored. Co-pending U.S. patent application Ser. No. 13/745,503 entitled Methods and Apparatus for Data Processing filed Jan. 18, 2013 provides details of an exemplary method of updating the data storage tracking tables 702, 704 and 706. Processing then proceeds to return step 660.

In step 658, the received block of data is de-duplicated by incrementing a count value associated with the physical block address at which the previously stored block of data for which the received block of data is a duplicate, e.g., count value in the PBA table associated with the PBA address of the data block which matches the received data block. Additionally, the data storage and tracking tables, e.g., tables 702, 704, and 706 shown in FIG. 5 are updated to track the duplicate data block. Processing proceeds to return step 660.

In return step 660, an acknowledgement data stored message is returned and then processing in connection with routine 600 is concluded with respect to this received write request but processing continues with respect to other received requests and with monitoring for additional requests.

Subroutine 7000 of FIG. 7 illustrates an exemplary subroutine that may be, and in some embodiments is, used to implement the storage step 654. The steps of subroutine 7000 are implemented on the storage device 122 storage control module 302 processor 304. The subroutine begins at start step 7002 with processor 304 executing the steps of the subroutine. Processing then proceeds to step 7004. In step 7004, the data received with the write request is partitioned into N-1 portions containing an equal number of bits. N referring to the number of memory storage elements in the data storage device 122. In some embodiments, padding of the data with additional bits set to zero is performed if necessary so that the data can be portioned into N-1 portions containing an equal number of bits. Processing then proceeds to step 7006.

In step 7006 a parity error correcting segment, e.g., parity word or block, is generated from said N-1 portions of said received data generated in step 7004. Processing then proceeds to step 7008. In step 7008, the N-1 portions of said received data and the parity segment is stored in a distributed manner across the N memory storage elements 1, 2, 3, 4, ..., N. For example, as illustrated and explained in connection with FIG. 4, e.g., with respect to data A. Processing then proceeds to return step 7010 wherein processing in connection with subroutine 7000 is concluded.

Figure 8A:
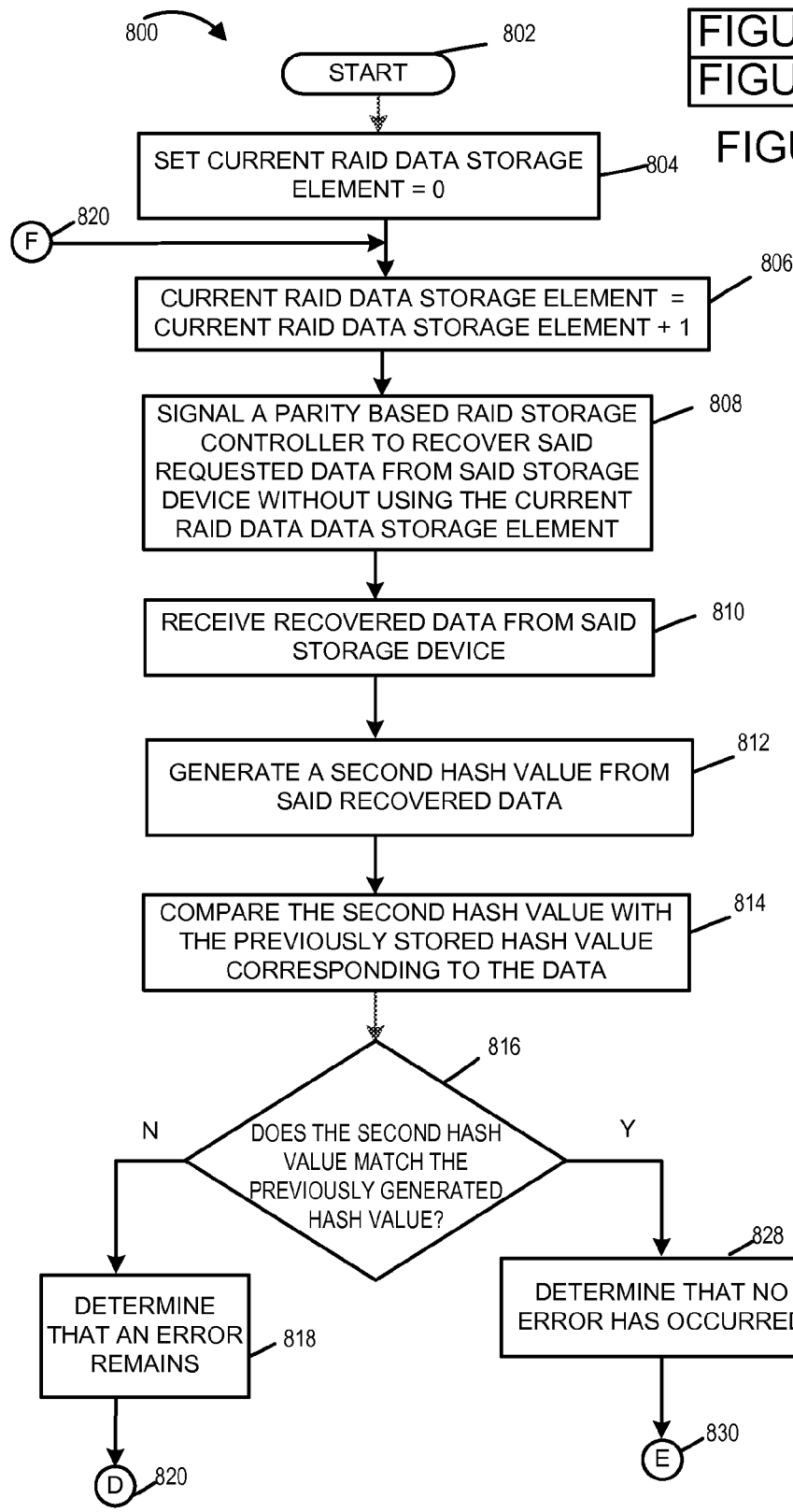
FIG. 8A which is a first part of FIG. 8 illustrates a first portion of an exemplary subroutine for performing an error recovery operation in accordance with one embodiment of the present invention.
Figure 8B:
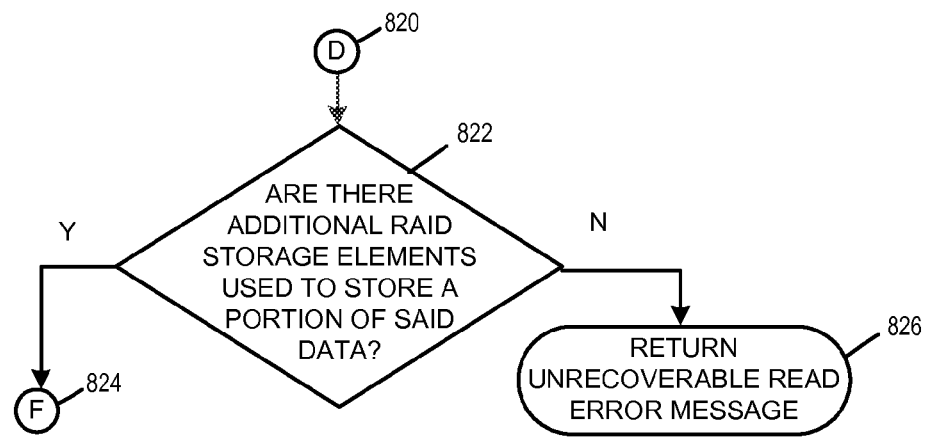
FIG. 8B which is a second part of FIG. 8 illustrates a second portion of an exemplary subroutine for performing an error recovery operation in accordance with one embodiment of the present invention.
Figure 8B:
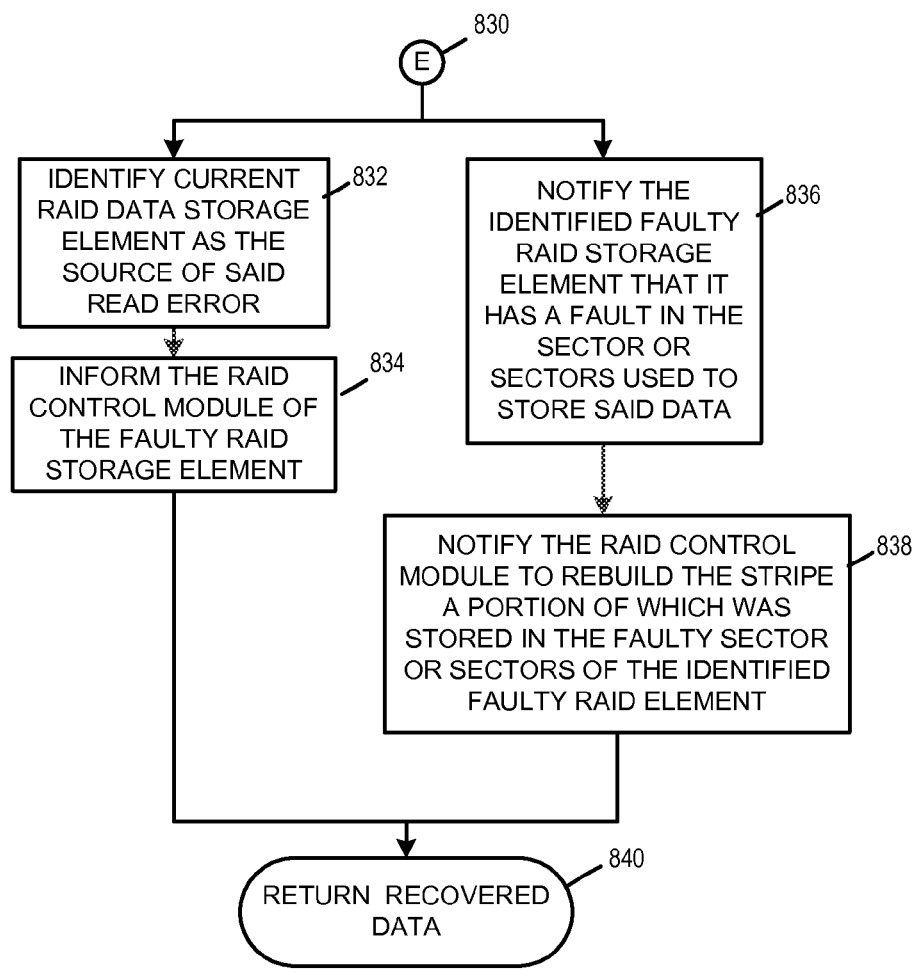

FIG. 8 illustrates an exemplary subroutine 800 which may be, and in some embodiments of the present invention is, used for implementing step 638 of method 600 of FIG. 6 which performs an error recovery operation using said stored error correcting bits corresponding to said data. FIG. 8 includes a first part, FIG. 8A, and a second part, FIG. 8B. The subroutine 800 starts as shown in FIG. 8A at start step 802 with subroutine 800 being executed on processor 110 from which execution proceeds to step 804. In step 804, a variable CURRENT RAID DATA STORAGE ELEMENT is set equal to 0. This is done to initialize the variable CURRENT RAID DATA STORAGE ELEMENT. There is no RAID storage element 0. The first RAID storage element is RAID storage element 1 312. Processing then proceeds to step 806.

In step 806 the CURRENT RAID DATA STORAGE ELEMENT is incremented by 1, e.g., CURRENT RAID DATA STORAGE ELEMENT=CURRENT RAID DATA STORAGE ELEMENT+1. Processing then proceeds to step 808.

In step 808 a signal is transmitted to a parity based RAID storage controller, e.g., RAID storage controller module 302, to recover said requested data from said storage device, e.g., 122, without using the CURRENT RAID DATA STORAGE ELEMENT, e.g., when the CURRENT RAID DATA STORAGE ELEMENT is 1, the requested data block will be recovered from RAID storage elements 2, 3, 4, ..., N over which the requested data was stored along with its error correcting information. The RAID controller upon receiving the signal will recover the requested data using the error correcting bits corresponding to the stored data. The RAID controller will then transmit the recovered data block to the processor 110 via the I/O interface 308. Processing will then proceed to step 810.

In step 810, the processor 110 receives the recovered data from said storage device 122. The recovered data may be, and in some embodiments is, stored in data/information 120 of memory 108 so that it is available for later use such as for example in later processing steps of the subroutine 800. Processing then proceeds to step 812.

In step 812, a second hash value is generated from said recovered data block. Processing then proceeds to comparison step 814. In comparison step 814, the second hash value is compared with the previously stored hash value corresponding to said data 625. Processing then proceeds to decision step 816. In decision step 816, if the second hash value matches the previously generated hash value 625 then processing proceeds to step 828. Otherwise, processing proceeds to step 818.

In step 818, it is determined that an error remains as the second hash value which was generated from the recovered data did not match the previously generated hash value. Processing proceeds from determination step 818 via connection node D 820 to decision step 822 shown in FIG. 8B.

In decision step 822, if it is determined there are additional RAID storage elements used to store a portion of said data processing proceeds to step 806 on FIG. 8A via connection node F 824. In step 806 the CURRENT RAID DATA STORAGE ELEMENT variable is incremented for example by setting the variable to equal the value of the CURRENT RAID DATA STORAGE ELEMENT+1. In this case, the CURRENT RAID DATA STORAGE ELEMENT will be set to equal 2. Processing then continues as previously discussed with processing proceeding from step 806 to 808 with the second RAID data storage element 314 being excluded from the data recovery process by the RAID controller as was previous discussed in connection with the first RAID data storage element. In this way each of the RAID storage elements will tested until the data is properly recovered.

In decision step 822, if it is determined that there are no additional RAID storage elements used to store a portion of said data, e.g., a stripe of said data, then processing proceeds to return step 826. In return step 826, an unrecoverable read error message is returned as the error recovery subroutine 800 has failed in recovering data that has a hash value that matches the previously stored hash value corresponding to the data and generated at the time the data was stored. Processing then concludes with respect to subroutine 800 but continues with respect to the method 600.

As previously discussed, if the second hash value matches the previously generated hash value in decision step 816 then processing proceeds to determination step 828. In determination step 828, it is determined that no error has occurred in connection with the recovered data. While it is possible that there may be a hash value collision wherein the recovered data has the same hash value as the previously stored data but is different, this is an extremely low possibility due the computational weight of hash value. Moreover, the data integrity of the recovered data with the matching hash value is far greater than the data integrity of the read without with the hash value check. As a result the determination is made that no error has occurred. Processing proceeds in parallel from step 828 via connection node E 830 to steps 832 and 836 shown on FIG. 8B.

In step 832 the CURRENT RAID DATA STORAGE ELEMENT is identified as the source of said read error. Processing then proceeds to step 834 where the RAID control module 302 is informed of the faulty RAID storage element. The RAID control module can then perform various checks and tests on the faulty storage element such as for example status checks, tests for data corruption, error checks, bad sector checks, checks for checksum errors and/or parity inconsistencies. If correctable errors are found than the RAID control module may, and in most embodiments does, correct the identified errors. In some embodiments, the RAID control module may, at the first convenient time such as historically low volume read or right times for example the first night after the source of the error is identified, perform a RAID level data scrub of the RAID storage elements.

In step 836, the faulty RAID storage element is notified that it has a fault in the sector or sectors used to store said data. In some embodiments, this is achieved by processor 110 sending a message to the faulty storage element, e.g., storage element 1 312 via bus 116 and I/O Interface 308. In at least some embodiments on receiving the notification that one or more sectors of the RAID storage element is faulty, the faulty RAID storage element will test those sectors corresponding to the stripe of data and if they fail mark those sectors as bad. In at least some embodiments, the RAID storage element will merely mark all sectors used to store the stripe of data as bad until a check of the individual sectors can be made. Processing then proceeds to step 838.

In step 838, the RAID control module 302 is notified to rebuild the stripe a portion of which was stored in the faulty sector or sectors of the identified faulty RAID element. In most embodiments but not all embodiments, upon receipt of such notification the RAID control module will rebuild the stripe using the error correcting bits, e.g., the parity control bits associated with the stripe of a which a portion of the data was bad.

While two parallel paths were shown and described for steps 832, 834 and 836 and 838, the steps of these two separate parallel paths may be and in some embodiments are performed sequentially. In those embodiments in which the steps of the parallel paths are performed sequentially, the order of which path is traversed first is not important.

Processing proceeds from steps 834 and 838 to return step 840. In return step 840, the recovered data with the second hash value that matches the previously stored hash value is returned. Processing then concludes with respect to subroutine 800 but processing continues with respect to method 600.

In some embodiments of the present invention, no de-duplication process is performed. For example, in the method 600 steps 648, 650, 652, and step 658 are not performed when de-duplication is not used. Instead processing proceeds from step 646 where the generated hash value is stored in an LBA to Hash value table at the logical block address received with the write request to step 654 where the received data is stored to the storage device with the intervening steps being bypassed. Processing then continues on from step 654 as previously described.

Figure 9:
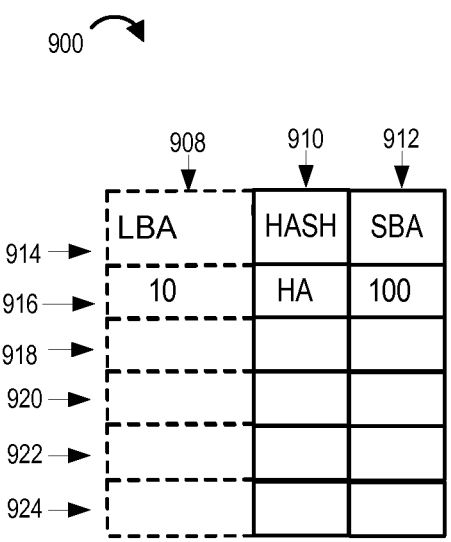
FIG. 9 illustrates an exemplary logical block address to hash value table that may be, and in some embodiments is, used in implementing the present invention.

FIG. 9 illustrates a second exemplary LBA to hash value table 900 which may be, and is, used in some embodiments of the present invention. The LBA to hash table 900 includes three columns of information. The first row 914 of the LBA to hash table 900 is a header that is not part of the table but is merely provided to help explain the table. The first column 908 of the LBA to hash value table 900 includes logical block addresses, the second column 910 of the LBA to hash value table 900 includes hash values, and the third column 912 of the LBA to hash value table includes a storage device block address which is the address associated with the storage of the data block on the storage device. The table includes a plurality of rows wherein each row of the table associates the data contained in that row. For example, in the first row of the table which may contain content row 916 the logical block address in the first column 908 of the row 916 is associated with the hash value in the second column 910 of the row 916 and storage block address in the third column 912 of the row 916. In some embodiments, column 908 which includes the logical block address information is merely an index into the table and not a column of data in the table. The row 916 contains the following information: a logical block address of 10 in entry row 916 column 908, a hash value of HA in entry row 916 column 910 associated with the logical block address of 10, and a storage device address of 100 in entry row 916 column 912. From these entries it can be understood that a data block written to logical block address 10 has a hash value of HA and the data block is stored in the storage device at storage block address 100 which may be, and in some embodiments is, a logical block address. In some embodiments, the storage block address is a physical block address. The table 900 may be and in some embodiments is stored in data/information 120 of memory 108. In some embodiments, this hash value table may and does include information as to whether the data block is a duplicate for example a count entry indicating the number of duplicate data blocks.

Figure 10:
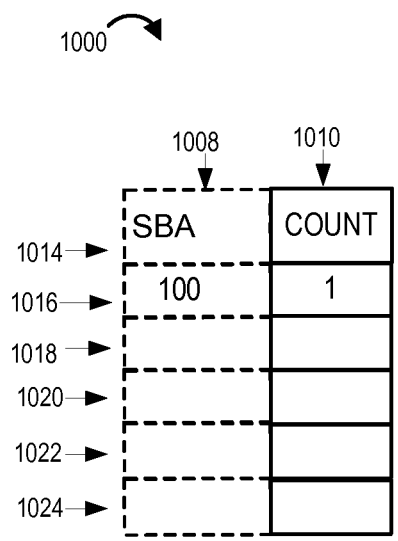
FIG. 10 illustrates an exemplary storage block address table that may be, and in some embodiments is, used in implementing the present invention.

FIG. 10 illustrates an exemplary storage block address table that may be, and in some embodiments is, used in implementing the present invention. In some embodiments of the present invention, this exemplary storage block address table is used in conjunction with the LBA to hash value table of FIG. 9. The first row 1014 of the SBA table 1000 is a header that is not part of the table but is merely provided to help explain the table. The first column 1008 of the SBA table 1000 includes storage block addresses which are associated with blocks of data. In some embodiments, the storage block addresses are physical block addresses. In some embodiments the storage block addresses are logical block addresses for the storage device. The second column 1010 of the SBA table 1000 includes a count value which is the number of times the data block stored at the SBA address of column 1008 is referenced in the system. The count is used to track the number of duplicate data blocks. For each LBA address that is associated with the SBA address the count is increased by 1. The table includes a plurality of rows wherein each row of the table associates the data contained in that row. For example, in the first row of the table which may contain content row 1016 the storage block address in the first column 1008 of the row 1016 is associated with the count value in the second column 1010 of the row 1016. In some embodiments, column 1008 which includes the logical block address information is merely an index into the table and not a column of data in the table. The row 1016 contains the following information: a storage block address of 100 in entry row 1016 column 1008 and a count value of 1 in entry row 1016 column 1010 associated with the storage block address of 100.

An example is now provided which explains how the tables 900 and 1000 may be, and in some embodiments are, updated when the de-duplication is used. When a write request to LBA 20 is received with the same block of data A as stored in SBA 100, the data block A hash value would be determined to be HA. At LBA 20 in the LBA to Hash value table the hash value HA would be entered in the second column which is the hash column. The LBA to hash value table would be searched for matching hash value entries. In this case, the hash value associated with LBA 10 would be determined to be a match. A determination would then be made if the data block at SBA value of 100 associated with LBA 10 is a match for the received block of data A to be stored, e.g., by doing a bit by bit comparison. In this case the received block of data A to be written to LBA 20 is a duplicate of the block of data A written to SBA 100. The SBA table 1000 is then accessed and at SBA 100 the count is increased by 1. The LBA to hash value table SBA address corresponding to LBA 20 is then updated to include the SBA address 100.

In some embodiments, such as those that use RAID 6 implementation with N total storage elements of which 2 storage elements in a stripe are used for parity, i.e., double parity, and N−2 storage elements in the stripe are used for data, up to two faulty storage elements may be detected by performing N−2 reads of storage elements in the stripe and performing a recovery operation. While RAID 6 is used in some embodiments RAID 5 is used in other embodiments.

In some embodiments of the present invention, the storage data element block size is a multiple of the logical data block size upon which the hash value is computed. In such embodiments, the storage element data block that is written to a storage element is an aggregation of a number of logical data blocks. Moreover, the size of the full RAID data stripe is the number of storage data element blocks times the number of storage elements across which the data is to be distributed in the RAID array.

Figure 11:
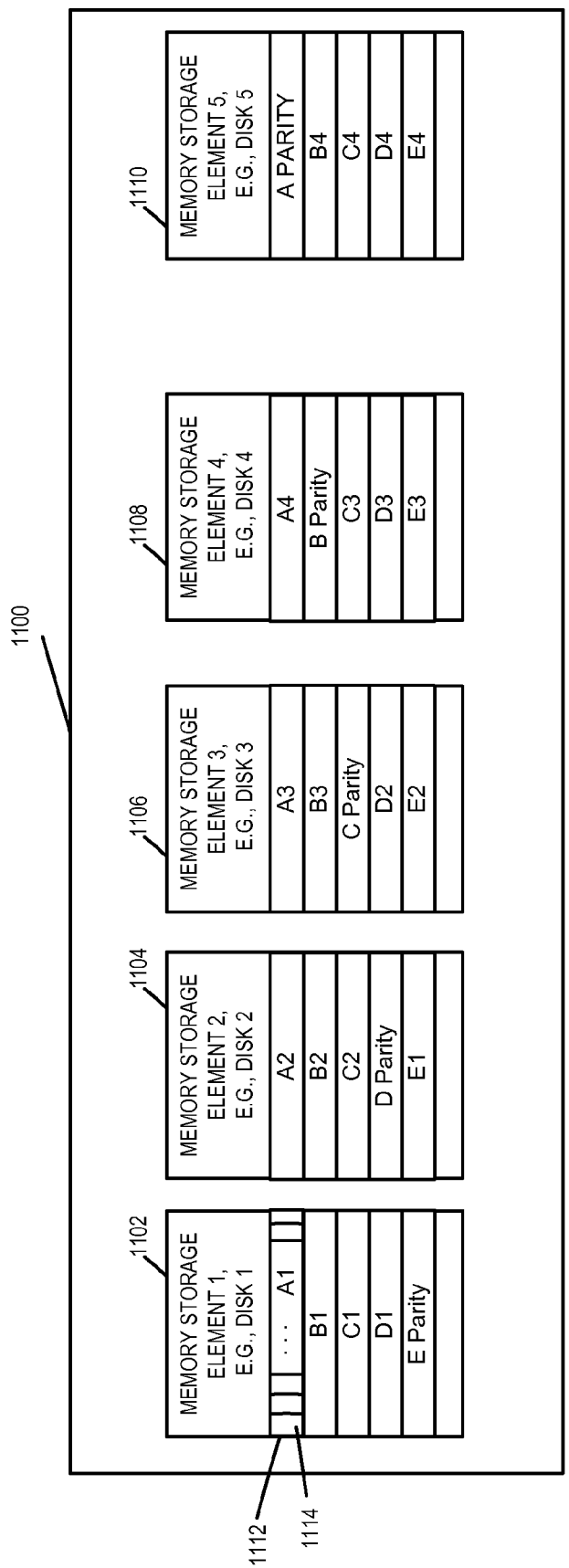
FIG. 11 illustrates exemplary storage elements of an exemplary storage device in accordance with one embodiment of the present invention.

The above example can be further explained in view of FIG. 11 which shows a RAID 5 implementation. In the example of FIG. 11, there are a total of 5 memory storage elements: memory storage element 1 1102, memory storage element 2 1104, memory storage element 3 1106, memory storage element 4 1108, and memory storage element 5 1110. RAID stripe A includes part A1 stored on memory storage element 1 1102, part A2 stored on memory storage element 2 1104, part A3 stored on memory storage element 3 1106, part A4 stored on memory storage element 4 1108, and A parity stored on memory storage element 5 1110. Parts A1, A2, A3, A4, and A PARITY are all of the same size which is the storage element size. For explanatory purposes in this example, the storage element size is 64 kilobytes. Therefore part A1 1112 contains 64 kilobytes of data, part A2 contains 64 kilobytes of data, part A3 contains 64 kilobytes of data, part A4 contains 64 kilobytes of data and A PARITY contains 64 kilobytes of error correction information, e.g., parity bits, generated from parts A1, A2, A3, and A4. As there are 4 storage elements over which the data A has been distributed in stripe A of the RAID 5 array 1100, the RAID data storage stripe size is 256 kilobytes that is 64 kilobytes times 4 storage elements on which data has been distributed. Each data part A1, A2, A3, and A4 contains 16 sub-elements equal to 4 kilobytes each which is the size of a single logical data block. For example, part A1 1112 is divided up into 16 sub-elements of 4 kilobyte sizes. Part A1 shows an exemplary first sub-element 1114. The 256 kilobytes stored across the stripe is an aggregation of 64 logical data blocks with 16 logical data blocks being stored on each of part A1, part A2, part A3, and part A4. For purposes of explanation it will be assumed that a logical data block G of size 4 kilobytes associated with logical block address 10 has been stored in sub-element 1114 of part A 1112 storage element 1 1102.

In this example, when a read logical block address request associated with the logical data block G is received the system determines the previously generated hash value for the logical block address from a hash value table for example LBA to hash table 9 and obtains the storage block address in which the data block is stored. A read request is sent to the RAID control module which retrieves the requested block and then the sub-element 1114 from the storage block. The RAID control module provides the retrieved 4 kilobyte data block to the processor 110. The processor 110 performs a hash generation operation on the retrieved block of data G and then compares the value generated from the retrieved data block to the hash value previously generated for block G when it was written to storage. If the two hash value do not match it is determined that there has been a read error. The read error may have been the result of noise on the bus 116, or of two bits being flipped that were not detected by the light weight parity checked performed by the storage element upon retrieval. At this point, the processor 110 can request the RAID control module provide the identity of the storage element of the RAID array from which the logical data block G was retrieved. In this example, the RAID control module would identify storage element 1. The processor 110 can then request that the RAID control module retrieve and provide to it the data contained in part A2, part A3, part A4 and the A parity from the stripe along with the identity of the location of the 4 kilobytes in the stripe corresponding to the logical block address G in storage element 1.

In this example, the location of the logical block address G is the first sub-element in part A1 which is the first 4 kilobytes in part A1. The processor 110 can then use the data contained in first 4 kilobytes, i.e., the first sub-element, from part A2, part A3, part A4 and the corresponding parity bits from A parity to attempt to recover the logical data block G. In some embodiments, the processor 110 can request and receive just the portions corresponding to the parts A2, A3, A4 and A parity that are necessary to reconstruct the logical data block G contained in sub-element 1114 of part A1 112. In at least some embodiments, instead of the processor 110 reconstructing the data block G the processor sends a command to the RAID control module to provide a reconstructed sub-element 1114 from storage elements 2 1104, 3 1106, 4 1108 and 5 1110. The reconstructed sub-element 1114 corresponds to the data block G.

After the processor reconstructs the data block G or receives the reconstructed data block G from the RAID control module, it generates a hash value from the reconstructed block of data and compares it to the hash value previously generated when the data block G was stored in memory. If the two hash values now match then the processor can send a message to the RAID control module that the sector(s) and/or erase block(s) corresponding to the first sub-element 1114 contains errors, e.g., are corrupted, and that the data stripe A should be rebuilt. The RAID control module can then mark the corresponding sector or sectors and/or erase block or blocks and rebuild the stripe A.

In some embodiments, for example those embodiments using a RAID 6 configured storage array having N storage elements with data distributed across a stripe of the array on N−2 storage elements and parity error correcting bits for the stripe stored on the remaining two storage elements of the stripe and wherein the logical block address is smaller than the storage block address, when a hash error is detected during the hash comparison step of a read operation, the RAID control module is requested to make N−1 read operations to construct to determine if one or more storage elements data in the stripe contains errors.

A method of processing stored data in accordance with one embodiment of the present invention includes the steps of reading data stored with error correcting bits from a storage device, e.g., storage device 122, performing a hash operation on the data read from the storage device to generate a first hash value, comparing said first hash value to a previously generated hash value corresponding to said data, and determining that a read error has occurred when said first hash value does not match said previously generated hash value. The method may be implemented on system 100 with the processor 110 of system 100 executing the steps of the method. In some embodiments of the present invention, said previously generated hash value was generated in response to a write request and the method further includes recovering said hash value from a memory table of hash values, said hash values corresponding to data blocks written to said storage device. In most embodiments of the present invention, said data is a logical data block and said previously generated hash value was generated from said logical data block using the same hash function used to generate said first hash value.

Some embodiments of the present invention include a method of processing stored data including the steps of reading data stored with error correcting bits from a storage device, e.g., storage device 122, performing a hash operation on the data read from the storage device to generate a first hash value, comparing said first hash value to a previously generated hash value corresponding to said data, determining that a read error has occurred when said first hash value does not match said previously generated hash value, and when it is determined that a read error has occurred, performing an error recovery operation using said stored error correcting bits corresponding to said data. In some of such embodiments of the present invention where there are N storage elements and data is distributed in a stripe over N−1 elements and error recovery parity bits for the data storage stripe is stored on 1 storage element, performing said error recovery operation includes signaling a parity based RAID storage controller to execute N−1 reads of storage elements to recover information, where N is the number of storage elements in a stripe of said storage device and wherein in an individual stripe at least M of said N storage elements store parity bits and a remaining N-M storage elements store data corresponding to said stripe, M and N being integer values, M being at least 1, N being at least 3, the M parity bits having been generated from data stored in the N-M storage elements of the stripe, generating a second hash value from the recovered information, comparing the generated second hash value to the previously generated hash value corresponding to said data, and determining that an error remains when there is not a match and determining that no error has occurred when there is a match.

In some embodiments of the present invention, the error recovery operation includes: signaling a parity based RAID storage controller to execute N−1 reads of storage elements to recover information, where N is the number of storage elements in a stripe of said storage device and wherein in an individual stripe at least M of said N storage elements store parity bits and a remaining N-M storage elements store data corresponding to said stripe, M and N being integer values, M being at least 1, N being at least 3; generating a second hash value from the recovered information obtained from said N−1 reads of storage elements; comparing the generated second hash value to the previously generated hash value corresponding to said data; and determining that an error remains when there is not a match; and determining that no error has occurred when there is a match.

In some embodiments of the present invention the method further includes identifying based on which returned result from the error recovery operation did not include an error which RAID storage element was the source of the error.

In some embodiments of the present invention, the method includes informing the RAID control module of the faulty RAID storage element so that the RAID storage device may for example take the fault storage element off line and rebuild the data stored on the faulty element on a spare storage element.

In some embodiments of the present invention, the RAID control module may be, and is, a software control module.

In some embodiments of the present invention, the method includes notifying the identified faulty RAID storage element that it has a fault in one or more sectors used to store said data and also notifying the RAID control module to rebuild the stripe a portion of which was stored in the faulty sector. In such embodiments, the RAID storage element may, and typically does, block out the sector or sectors identified as being faulty.

In some embodiments of the present invention, the method includes notifying the identified faulty RAID storage element that it has a fault in one or more erase blocks used to store said data for example when the storage element is a NAND flash memory and notifying the RAID control module to rebuild the stripe a portion of which was stored in the faulty erase block or blocks.

is generated as part of a data de-duplication operation.

Some embodiments of the present invention include a method of processing stored data includes the steps of reading data stored with error correcting bits from a storage device, receiving said data by a RAID control module from a RAID storage elements without an indication of error, performing a hash operation on the data read from the storage device to generate a first hash value, comparing said first hash value to a previously generated hash value corresponding to said data, and determining that a read error has occurred when said first hash value does not match said previously generated hash value. In some of such embodiments, the method detects errors which the RAID controller's error checking such as CRC check or checksum does not detect for example if two bits were flipped.

While a logical sequencing of the processing steps of the exemplary embodiments of the methods, routines and sub-routines of the present invention have been shown, the sequencing is only exemplary and the ordering of the steps may be varied.

Numerous embodiments incorporating one or more of the above discussed features are possible. In one exemplary embodiment a data processing apparatus includes a data retrieval module configured to read data stored with error correcting bits from a storage device, a hash generation module configured to perform a hash operation on the data read from the storage device to generate a first hash value, a comparison module configured to compare said first hash value to a previously generated hash value corresponding to said data and a read error determination module configured to determine that a read error has occurred when said first hash value does not match said previously generated hash value. In one such embodiment the previously generated hash value was generated in response to a write request and the apparatus further includes a hash value recovery module configured to recover said previously generated hash value from a memory table of hash values, said hash values corresponding to data blocks written to said storage device. In at least one embodiment the data is a logical data block and the previously generated hash value is a hash value that was generated from said logical data block using the same hash function used to generate said first hash value. The exemplary apparatus may, and in some embodiments does, include an error recovery module configured to perform an error recovery operation using said stored error correcting bits corresponding to said data when it is determined that a read error has occurred. The error recovery module in at least some embodiments includes a signaling module configured to signal a parity based RAID storage controller to execute N−1 reads of data storage elements to recover information, where N is the number of storage elements in a stripe of said storage device and wherein in an individual stripe at least M of said N storage elements store parity bits and a remaining N-M storage elements store data corresponding to said stripe, M and N being integer values, M being at least 1, N being at least 3. The apparatus in at least some such embodiments includes a second hash generation module configured to generate a second hash value from the recovered information, a hash value comparison module configured to compare the generated second hash value to the previously generated hash value corresponding to said data, and an error determination module configured to determine that an error remains when there is not a match and determine that no error has occurred when there is a match. The apparatus may, and in some embodiments also does include an error source identification module configured to identify, based on which returned result did not include an error, which data storage element was the source of the error and a RAID controller fault notification module configured to inform the RAID storage controller of the identified faulty data storage element. In addition the apparatus includes a first data storage element fault notification module configured to notify the identified faulty data storage element that it has a fault in one or more sectors used to store said data and a first RAID controller rebuild notification module configured to notify the RAID storage controller to rebuild the stripe a portion of which was stored in the faulty sector.

In some embodiments the apparatus further includes a second data storage element fault notification module configured to notify the identified faulty data storage element that it has a fault in one or more erase blocks used to store said data and a second RAID controller rebuild notification module configured to notify the RAID controller to rebuild the stripe a portion of which was stored in the faulty erase block.

In some but not necessarily all embodiments the apparatus also includes a data de-duplication module configured to perform a data de-duplication operation, said data de-duplication operation including generating said previously generated hash value.

In some embodiments data was received by a RAID storage controller from data storage elements without an indication of error.

Figure 12:
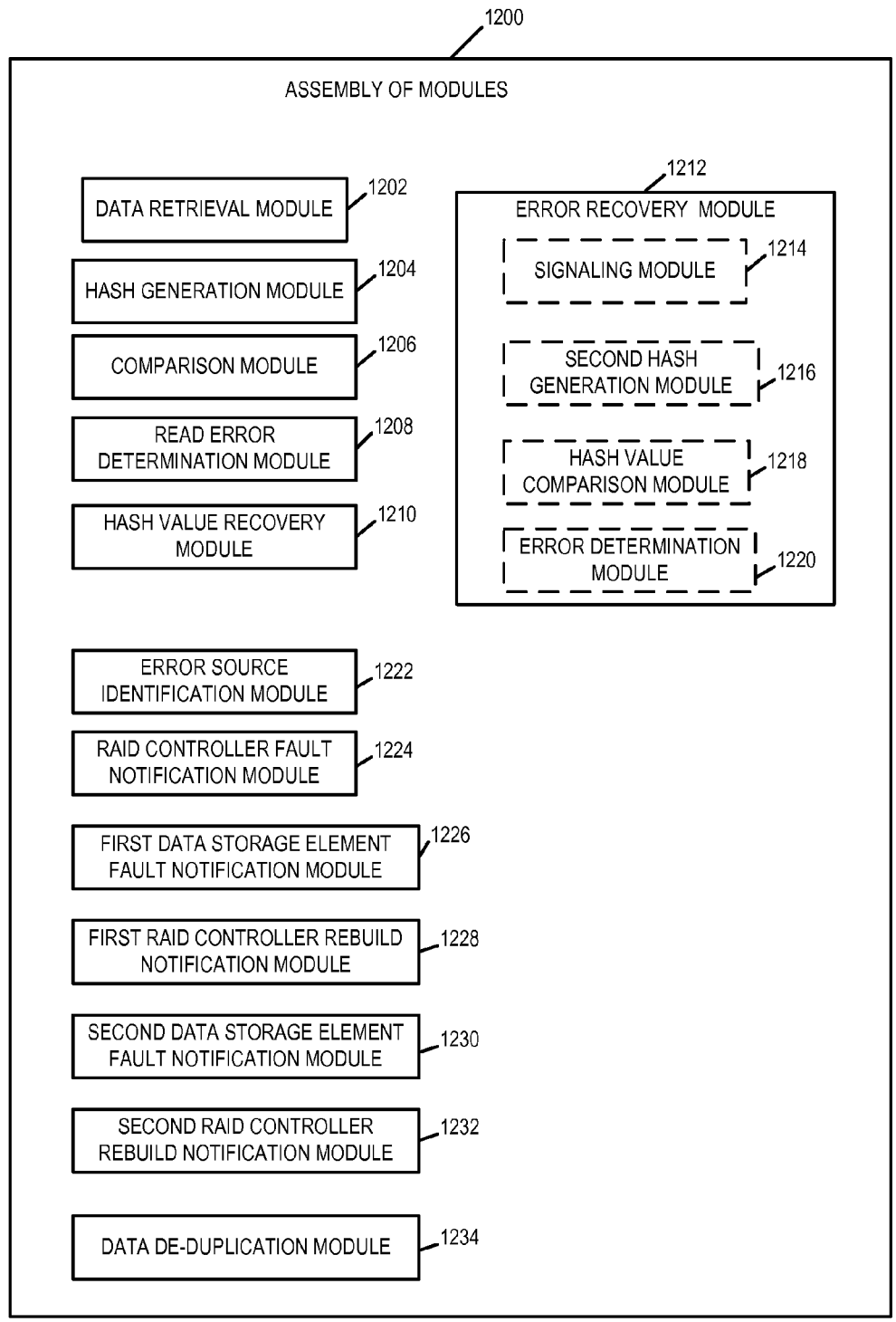
FIG. 12 illustrates an exemplary assembly of modules which can be used in the computer system of FIG. 1.

FIG. 12 illustrates an exemplary assembly of modules 1200 in accordance with various exemplary embodiments. Assembly of modules 1200 is, e.g., assembly of modules 118, included in memory 108 of computer system 100 of FIG. 1.

Assembly of modules 1200 includes a data retrieval module 1202 configured to read data stored with error correcting bits from a storage device, a hash generation module 1204 configured to perform a hash operation on the data read from the storage device to generate a first hash value, a comparison module 1206 configured to compare said first hash value to a previously generated hash value corresponding to said data, and a read error determination module 1208 configured to determine that a read error has occurred when said first hash value does not match said previously generated hash value.

In some embodiments, the previously generated hash value was generated in response to a write request. Assembly of modules 1200 further includes a hash value recovery module 1210 configured to recover said previously generated hash value from a memory table of hash values, said hash values corresponding to data blocks written to said storage device. In at least one embodiment the data is a logical data block and the previously generated hash value is a hash value that was generated from said logical data block using the same hash function used to generate said first hash value.

Assembly of modules 1200 further includes an error recovery module 1212 configured to perform an error recovery operation using said stored error correcting bits corresponding to said data when it is determined that a read error has occurred. The error recovery module 1212 in at least some embodiments includes a signaling module 1214 configured to signal a parity based RAID storage controller to execute N−1 reads of data storage elements to recover information, where N is the number of storage elements in a stripe of said storage device and wherein in an individual stripe at least M of said N storage elements store parity bits and a remaining N-M storage elements store data corresponding to said stripe, M and N being integer values, M being at least 1, N being at least 3. Error recovery module 1212, in at least some such embodiments, includes a second hash generation module 1216 configured to generate a second hash value from the recovered information, a hash value comparison module 1218 configured to compare the generated second hash value to the previously generated hash value corresponding to said data, and an error determination module 1220 configured to determine that an error remains when there is not a match and determine that no error has occurred when there is a match.

Assembly of modules 1200 further includes an error source identification module 1222 configured to identify, based on which returned result did not include an error, which data storage element was the source of the error, and a RAID controller fault notification module 1224 configured to inform the RAID storage controller of the identified faulty data storage element. In addition, assembly of modules 1200 includes a first data storage element fault notification module 1226 configured to notify the identified faulty data storage element that it has a fault in one or more sectors used to store said data and a first RAID controller rebuild notification module 1228 configured to notify the RAID storage controller to rebuild the stripe a portion of which was stored in the faulty sector. Assembly of modules 1200 further includes a second data storage element fault notification module 1230 configured to notify the identified faulty data storage element that it has a fault in one or more erase blocks used to store said data and a second RAID controller rebuild notification module 1232 configured to notify the RAID controller to rebuild the stripe a portion of which was stored in the faulty erase block. Assembly of modules 1200 also includes a data de-duplication module 1234 configured to perform a data de-duplication operation, said data de-duplication operation including generating said previously generated hash value.

The techniques of various embodiments may be implemented using software, hardware, e.g., circuits, and/or a combination of software and hardware. Various embodiments are directed to apparatus, e.g., a data processing system. Various embodiments are also directed to methods, e.g., a method of processing data. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., with each module being implemented as a circuit for performing the function corresponding to the individual module. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of processing stored data, the method comprising:
   reading data stored with error correcting bits from a storage device;
   performing a hash operation on a data portion of the data read from the storage device separate from an error correcting bit portion to generate a first hash value;
   comparing said first hash value to a previously generated hash value corresponding to said data portion, wherein the previously generated hash value and the error correcting bits are different;
   determining that a read error has occurred when said first hash value does not match said previously generated hash value; and
   when it is determined that a read error has occurred, performing an error recovery operation to determine a source of the read error, the error recovery operation comprising:
   (a) determining a current Redundant Array of Independent Drives (RAID) storage element;
   (b) recovering information from other RAID storage elements excluding the current RAID storage element;
   (c) generating a second hash value from the recovered information;
   (d) comparing the generated second hash value to the previously generated hash value corresponding to said data portion;
   (e) determining that an error remains when there is not a match between the generated second hash value and the previously generated hash value;
   (f) determining that no error remains when there is a match between the generated second hash value and the previously generated hash value;
   (g) identifying a particular RAID storage element as the source of the read error when the particular RAID storage element has been excluded from the generated second hash value and there is a match between the generated second hash value and the previously generated hash value; and
   (h) advancing the current RAID storage element to a next RAID storage element and repeating (a), (b), (c), (d), (e), (f) and (g) until the source of the read error is identified.

2. The method of claim 1, wherein said previously generated hash value was generated in response to a write request, the method further comprising:
   recovering said hash value from a memory table of hash values, said hash values corresponding to data blocks written to said storage device.

3. The method of claim 2, wherein said data portion of said data is a logical data block and wherein said previously generated hash value was generated from said logical data block using the same hash function used to generate said first hash value.

4. The method of claim wherein generating said previously generated hash value is part of a data de-duplication operation.

5. The method of claim 1, wherein said error recovery operation further comprises:
   signaling a parity based RAID storage controller to execute N−1 reads of RAID storage elements to recover the information from the other RAID storage elements excluding the current RAID storage element, where N is the number of RAID storage elements in a stripe of said storage device and wherein in an individual stripe at least M of said N RAID storage elements store parity bits and a remaining N-M RAID storage elements store the data portion of the data corresponding to said stripe, M and N being integer values, M being at least 1, N being at least 3.

6. The method of claim 5, further comprising:
informing the RAID storage controller of the faulty RAID storage element.

7. The method of claim 5, further comprising:
notifying the identified faulty RAID storage element that it has a fault in one or more sectors used to store said data; and
notifying the RAID storage controller to rebuild the stripe a portion of which was stored in the faulty sector.

8. The method of claim 5, further comprising:
notifying the identified faulty RAID storage element that it has a fault in one or more erase blocks used to store said data; and
notifying the RAID storage controller to rebuild the stripe a portion of which was stored in the faulty erase block.

9. A data processing apparatus comprising:
a data retrieval module configured to read data stored with error correcting bits from a storage device;
a hash generation module configured to perform a hash operation on a data portion of the data read from the storage device separate from an error correcting bit portion to generate a first hash value;
a comparison module configured to compare said first hash value to a previously generated hash value corresponding to said data, wherein the previously generated hash value and the error correcting bits are different;
a read error determination module configured to determine that a read error has occurred when said first hash value does not match said previously generated hash value; and
an error recovery module configured to perform an error recovery operation to determine a source of the read error when it is determined that a read error has occurred, the error recovery operation comprising:
  (a) determining a current Redundant Array of Independent Drives (RAID) storage element;
  (b) recovering information from other RAID storage elements excluding the current RAID storage element;
  (c) generating a second hash value from the recovered information;
  (d) comparing the generated second hash value to the previously generated hash value corresponding to said data portion;
  (e) determining that an error remains when there is not a match between the generated second hash value and the previously generated hash value;
  (f) determining that no error remains when there is a match between the generated second hash value and the previously generated hash value;
  (g) identifying a particular RAID storage element as the source of the read error when the particular RAID storage element has been excluded from the generated second hash value and there is a match between the generated second hash value and the previously generated hash value; and
  (h) advancing the current RAID storage element to a next RAID storage element and repeating (a), (b), (c), (d), (e), (f) and (g) until the source of the read error is identified.

10. The apparatus of claim 9, wherein said previously generated hash value was generated in response to a write request, the apparatus further comprising:
a hash value recovery module configured to recover said previously generated hash value from a memory table of hash values, said hash values corresponding to data blocks written to said storage device.

11. The apparatus of claim 10, wherein said data portion of said data is a logical data block and wherein said previously generated hash value was generated from said logical data block using the same hash function used to generate said first hash value.

12. The apparatus of claim 10, wherein said error recovery module further comprises:
a signaling module configured to signal a parity based RAID storage controller to execute N-1 reads of data RAID storage elements to recover the information from the other RAID storage elements excluding the current RAID storage element, where N is the number of RAID storage elements in a stripe of said storage device and wherein in an individual stripe at least M of said N RAID storage elements store parity bits and a remaining N-M RAID storage elements store the data portion of the data corresponding to said stripe, M and N being integer values, M being at least 1, N being at least 3.

13. The apparatus of claim 12, further comprising:
a RAID controller fault notification module configured to inform the RAID storage controller of the identified faulty RAID storage element.

14. The apparatus of claim 12, further comprising:
a first data storage element fault notification module configured to notify the identified faulty RAID storage element that it has a fault in one or more sectors used to store said data; and
a first RAID controller rebuild notification module configured to notify the RAID storage controller to rebuild the stripe a portion of which was stored in the faulty sector.

15. A computer program product for use in a data processing apparatus, the computer program product comprising:
a non-transitory computer readable medium comprising:
  code for causing at least one computer to read data stored with error correcting bits from a storage device;
  code for causing said at least one computer to perform a hash operation on a data portion of the data read from the storage device separate from an error correcting bit portion to generate a first hash value;
  code for causing said at least one computer to compare said first hash value to a previously generated hash value corresponding to said data, wherein the previously generated hash value and the error correcting bits are different;
  code for causing said least one computer to determine that a read error has occurred when said first hash value does not match said previously generated hash value; and
  code for causing said at least one computer to perform an error recovery operation to determine a source of the read error when it is determined that a read error has occurred, the error recovery operation comprising:

(a) determining a current Redundant Array of Independent Drives (RAID) storage element;
(b) code for recovering information from other RAID storage elements excluding the current RAID storage element;
(c) code for generating a second hash value from the recovered information;
(d) code for comparing the generated second hash value to the previously generated hash value corresponding to said data portion;
(e) code for determining that an error remains when there is not a match between the generated second hash value and the previously generated hash value;
(f) code for determining that no error remains when there is a match between the generated second hash value and the previously generated hash value;
(g) code for identifying a particular RAID storage element as the source of the read error when the particular RAID storage element has been excluded from the generated second hash value and there is a match between the generated second hash value and the previously generated hash value; and
(h) code for advancing the current RAID storage element to a next RAID storage element and repeating (a), (b), (c), (d), (e), (f) and (g) until the source of the read error is identified.

* * * * *